US012761502B2

(12) United States Patent
Harris et al.

(10) Patent No.: US 12,761,502 B2
(45) Date of Patent: Oct. 13, 2026

(54) OPHTHALMIC SYSTEMS HAVING IMPROVED LIGHT FILTRATION

(71) Applicant: Eyesafe Inc., Eden Prairie, MN (US)

(72) Inventors: Derek Harris, Saint Paul, MN (US); Madelane Omole, Saint Paul, MN (US); Paul Herro, Eden Prairie, MN (US)

(73) Assignee: Eyesafe Inc., Eden Prairie, MN (US)

(*) Notice: Subject to any disclaimer, the term of this patent is extended or adjusted under 35 U.S.C. 154(b) by 0 days.

(21) Appl. No.: 19/649,880

(22) Filed: Apr. 16, 2026

(65) Prior Publication Data

US 2026/0251921 A1 Aug. 27, 2026

Related U.S. Application Data

(63) Continuation-in-part of application No. 19/279,312, filed on Jul. 24, 2025, which is a continuation of application No. PCT/US2025/016226, filed on Feb. 17, 2025.

(60) Provisional application No. 63/558,735, filed on Feb. 28, 2024.

(51) Int. Cl.
*G02C 7/10* (2006.01)

(52) U.S. Cl.
CPC .................................... *G02C 7/10* (2013.01)

(58) Field of Classification Search
CPC ........ G02C 7/10; G02B 5/22; G02B 27/0955; G02B 5/02; G02F 1/133514; G02F 1/133621; G02F 1/133607; G02F 1/133504; G02F 1/133524; G02F 1/13353; B32B 7/023
See application file for complete search history.

(56) References Cited

U.S. PATENT DOCUMENTS

| | | | | |
|---|---|---|---|---|
| 9,759,845 | B2 * | 9/2017 | Bornhorst | G02B 26/008 |
| 10,901,125 | B2 * | 1/2021 | Barrett | G02B 5/208 |

* cited by examiner

*Primary Examiner* — Tuyen Tra
(74) *Attorney, Agent, or Firm* — GRUMBLES LAW PLLC; Brittany Haanan

(57) ABSTRACT

Light-filtering eyewear is provided that comprises a polymer substrate, at least three absorbing compounds combined with the polymer substrate, and a lens material combined with the polymer substrate and absorbing compounds, wherein the absorbing compounds each absorb light in a notch band having a full-width half maximum of no more than 40 nm. The absorbing compounds can be provided in combination so that, for light produced by a display screen that is transmitted through the light-filtering eyewear, the correlated color temperature is within 1000 Kelvin of the correlated color temperature for light produced by the display screen that is not transmitted through the light-filtering eyewear. Peak absorptions for the first, second, and third absorbing compounds can be between 436 nm-522 nm, 548 nm-616 nm, and 643 nm-730 nm, respectively. In some embodiments, a fourth absorbing compound can be provided in combination with the polymer substrate and absorbing compounds having peak absorption between 417 nm-465 nm.

22 Claims, 9 Drawing Sheets

OPHTHALMIC SYSTEMS HAVING IMPROVED LIGHT FILTRATION

FIELD

The present disclosure relates to a system and method for improving blue light filtration on electronic display systems and eyewear for use with light-emitting systems.

BACKGROUND

The use of electronic displays has become ubiquitous in modern society, with devices such as smartphones, laptops, and televisions being used for an average of several hours per day. However, the blue light or high energy visible (HEV) light that people are exposed to through use of these displays has been linked to a number of physiological impacts. Therefore, blue light has become a health concern with the emergence of light-emitting diodes (LEDs) and their increasing use in electronic display products such as OLED and LCD displays.

The Blue Light Hazard (BLH) curve, as defined by ICNIRP (International Commission on Non-Ionizing Radiation Protection), describes a wavelength range of emitted light where users see an increase in the risk to retina health. In other words, certain wavelengths of light are more likely to cause cell damage to the retina of the eye. The peak wavelength range where retina health is at risk is between 435 nm and 440 nm.

In addition to damaging eye health, blue and cyan light can also impact our circadian rhythms. More specifically, blue and cyan wavelengths of light are known to suppress melatonin production in our bodies, which can be useful in keeping us awake during the day. However, exposure to blue and/or cyan wavelengths of light can be detrimental when exposure occurs at night since these wavelengths can artificially suppress the melatonin production and keep us awake. CIE, the International Commission on Illumination (Commission Internationale de I'Éclairage), has defined the relative impact by wavelength to our circadian rhythms. The negative impact peaks at 490 nm.

Artificial lighting from electronic displays can be a significant contributor to the exposure to these HEV, blue, and cyan wavelengths. Within electronic displays, the brightness is often driven by one of two common technologies: LED (light emitting diode) and OLED (organic light emitting diode). Of the two, OLED displays are becoming more common because of their superior contrast ratio in comparison to LED displays.

The blue peak for OLED is typically shifted to a longer blue light wavelength, which places the peak to the right (longer wavelength) compared to the BLH peak but much closer to the melanopic wavelength peak. This shift to longer wavelengths (compared to LED displays) is good for reducing the BLH to the retina but is worse for the impact it has on circadian rhythms. Additionally, there are already known filtration and absorption systems for managing and reducing the BLH peak.

Therefore, blue light filtration at longer wavelengths is desirable for OLED displays or any other display having blue light wavelength peaks at longer wavelengths. The system described herein improves the impact of the filtration with lower impact on the color of the display and can be utilized either directly on/in the display or on/in eyewear (for example, glasses, ophthalmic lenses, or electronics, wearable devices (i.e., AR, VR, or XR)) that can be used in conjunction with a display.

SUMMARY

This disclosure relates to a blue light filtration for eyewear and for electronic display systems, and more particularly, relates to a blue light filtration device that can absorb longer wavelength blue light. In an illustrative but non-limiting example, the disclosure provides a light-filtering device (for example, eyewear), the light-filtering device comprising: a polymer substrate; a first absorbing compound combined with the polymer substrate; a second absorbing compound combined with the polymer substrate; a third absorbing compound combined with the polymer substrate; and a lens material having the polymer substrate, the first absorbing compound, the second absorbing compound, and the third absorbing compound added to the lens material. The first absorbing compound can absorb light in a notch band having a full-width half maximum of no more than 40 nm. The second absorbing compound can absorb light in a notch band having a full-width half maximum of no more than 40 nm. The third absorbing compound can absorb light in a notch band having a full-width half maximum of no more than 40 nm. Additionally, the first absorbing compound, the second absorbing, and the third absorbing compound can be provided in combination so that, for light produced by a screen transmitted through the light-filtering device, correlated color temperature may be within about 1000 Kelvin of the correlated color temperature for light produced by the screen that is not transmitted through the light-filtering device. The first absorbing compound can have peak absorption between 436 nm and 522 nm, the second absorbing compound can have peak absorption between 548 nm to 616 nm, and the third absorbing compound can have peak absorption between 643 nm to 730 nm.

In some cases, the first absorbing compound can have peak absorption between 477 nm and 505 nm. And in some cases, the first absorbing compound can have peak absorption between 483 nm and 503 nm. In cases where the first absorbing compound has peak absorption between 436 nm and 522 nm, the light-filtering device can have an average transmission value of between 55% and 65%. In cases where the first absorbing compound has peak absorption between 477 nm and 505 nm, the light-filtering device can have an average transmission value of between 30% and 44%. In cases where the first absorbing compound has peak absorption between 483 nm and 503 nm, the light-filtering device can have an average transmission value of between 65% and 72%

In some cases, the light-filtering device can provide a first minimum transmission value for the first absorbing compound at a first wavelength within a first wavelength range of 488 nm to 510 nm, a first maximum transmission value for the first absorbing compound at a second wavelength within a second wavelength range of 433 nm to 453 nm, and a second maximum transmission value for the first absorbing compound at a third wavelength within a third wavelength range of 516 nm to 526 nm. Further, the light-filtering device can have an average transmission between the first maximum absorption value and the second maximum absorption value of no more than 65%. Additionally, the first minimum transmission value may be no more than 35%, the first maximum transmission value may be at least 55%, and the second maximum transmission value may be at least 55%.

In some cases, the light-filtering device can provide a first minimum transmission value for the first absorbing compound at a first wavelength within a first wavelength range of 488 nm to 510 nm, a first maximum transmission value for the first absorbing compound at a second wavelength within a second wavelength range of 460 nm to 470 nm, and a second maximum transmission value for the first absorbing compound at a third wavelength within a third wavelength range of 514 nm to 522 nm. Further, the light-filtering device can have an average transmission between the first maximum absorption value and the second maximum absorption value of no more than 80%. Additionally, the first minimum transmission value may be no more than 68%, the first maximum transmission value may be at least 70%, and the second maximum transmission value may be at least 70%.

As mentioned above, in some cases, the second absorbing compound can have peak absorption between 548 nm and 616 nm. And in some cases, the second absorbing compound can have peak absorption between 575 nm and 600 nm. In cases where the second absorbing compound has peak absorption between 548 nm and 616 nm, the light-filtering device can have an average transmission value of between 42% and 57% or, alternatively, of between 58% and 65%. In cases where the second absorbing compound has peak absorption between 575 nm and 600 nm, the light-filtering device can have an average transmission value of between 22% and 35% or, alternatively, of between 42% and 49%.

In some cases, the light-filtering device can provide a first minimum transmission value for the second absorbing compound at a first wavelength within a first wavelength range of 582 nm to 592 nm, a first maximum transmission value for the second absorbing compound at a second wavelength within a second wavelength range of 543 nm to 570 nm, and a second maximum transmission value for the second absorbing compound at a third wavelength within a third wavelength range of 610 nm to 620 nm. Further, the light-filtering device can have an average transmission between the first maximum absorption value and the second maximum absorption value of no more than 60%. Additionally, the first minimum transmission value may be no more than 25%, the first maximum transmission value may be at least 50%, and the second maximum transmission value may be at least 50%; or, alternatively, the first minimum transmission value may be no more than 40%, the first maximum transmission value may be at least 65%, and the second maximum transmission value may be at least 70%.

As mentioned above, in some cases, the third absorbing compound can have peak absorption between 643 nm and 730 nm. And in some cases, the third absorbing compound can have peak absorption between 672 nm and 707 nm. In cases where the third absorbing compound has peak absorption between 643 nm and 730 nm, the light-filtering device can have an average transmission value of between 70% and 79% or, alternatively, of between 50% and 65%. In cases where the third absorbing compound has peak absorption between 672 nm and 707 nm, the light-filtering device can have an average transmission value of between 58% and 70% or, alternatively, of between 45% and 55%.

In some cases, the light-filtering device can provide a first minimum transmission value for the third absorbing compound at a first wavelength within a first wavelength range of 684 nm to 692 nm, a first maximum transmission value for the third absorbing compound at a second wavelength within a second wavelength range of 640 nm to 655 nm, and a second maximum transmission value for the third absorbing compound at a third wavelength within a third wavelength range of 725 nm to 735 nm. Further, the light-filtering device can have an average transmission between the first maximum absorption value and the second maximum absorption value of no more than 80%. Additionally, the first minimum transmission value may be no more than 65%, the first maximum transmission value may be at least 70%, and the second maximum transmission value may be at least 80%; or, alternatively, the first minimum transmission value may be no more than 53%, the first maximum transmission value may be at least 53%, and the second maximum transmission value may be at least 55%.

In some cases, the light-filtering device further comprises a fourth absorbing compound combined with the polymer substrate, wherein all four absorbing compounds are added to the lens material. The fourth absorbing compound can absorb light in a notch band having a full-width half maximum of no more than 40 nm. Additionally, the fourth absorbing compound can be provided in combination with the first, the second, and the third absorbing compounds so that, for light produced by a screen transmitted through the light-filtering device, correlated color temperature may be within about 1000 Kelvin of the correlated color temperature for light produced by the screen that is not transmitted through the light-filtering device. The fourth absorbing compound can have peak absorption between 417 nm and 465 nm.

In some cases, the fourth absorbing compound can have peak absorption between 427 nm and 447 nm. In cases where the fourth absorbing compound has peak absorption between 417 nm and 465 nm, the light-filtering device can have an average transmission value of between 50% and 60%. In cases where the fourth absorbing compound has peak absorption between 427 nm and 447 nm, the light-filtering device can have an average transmission value of between 35% and 43%.

In some cases, the light-filtering device can provide a first minimum transmission value for the fourth absorbing compound at a first wavelength within a first wavelength range of 430 nm to 440 nm, a first maximum transmission value for the fourth absorbing compound at a second wavelength within a second wavelength range of 410 nm to 420 nm, and a second maximum transmission value for the fourth absorbing compound at a third wavelength within a third wavelength range of 460 nm to 470 nm. Further, the light-filtering device can have an average transmission between the first maximum absorption value and the second maximum absorption value of no more than 60%. Additionally, the first minimum transmission value may be no more than 40%, the first maximum transmission value may be at least 60%, and the second maximum transmission value may be at least 75%.

The above summary is not intended to describe each and every example or every implementation of the disclosure. The Description that follows more particularly exemplifies various illustrative embodiments.

BRIEF DESCRIPTION OF THE DRAWINGS

The drawings are schematic illustrations and are not intended to limit the scope of the invention in any way. The drawings are not necessarily to scale.

DETAILED DESCRIPTION

Various embodiments will be described in detail with reference to the drawings. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover applications or embodiments without departing from the spirit or scope of the claims attached hereto. Also, it is to be understood that the phraseology and terminology used herein are for the purpose of description and should not be regarded as limiting.

Figure 1:
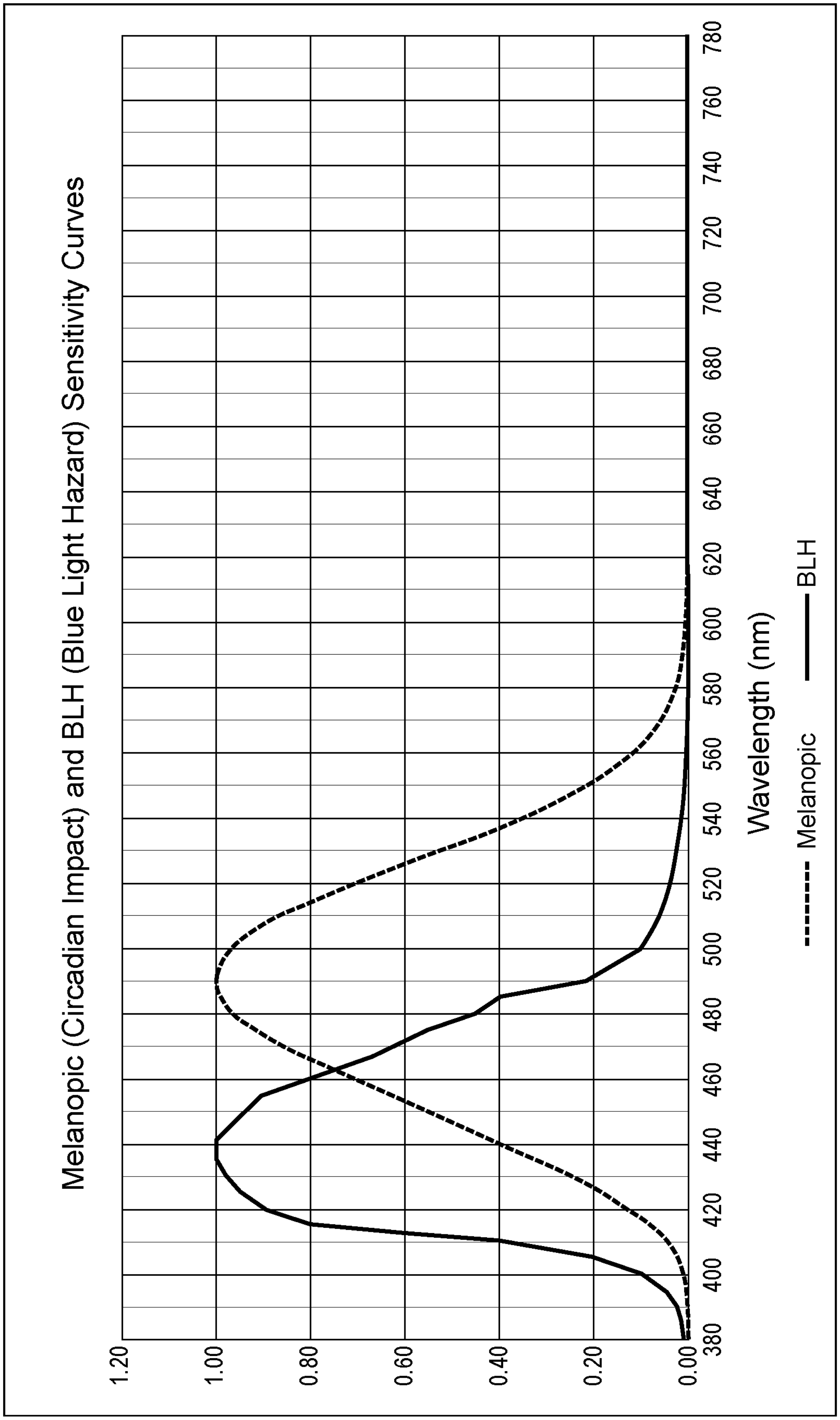
FIG. 1 is a graph illustrating Melanopic (circadian rhythm) and BLH (blue light hazard) sensitivity curves.
Figure 2:
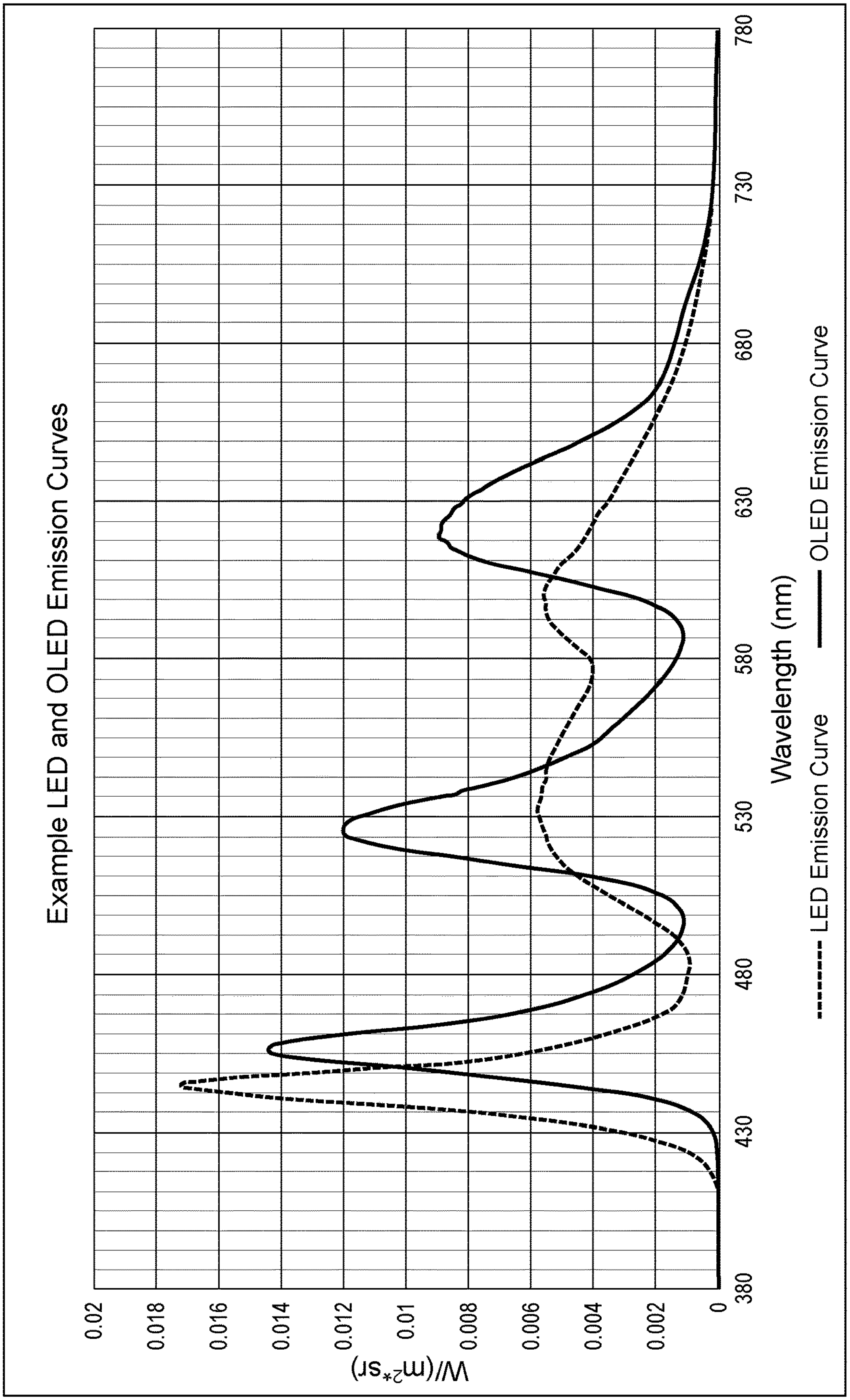
FIG. 2 illustrates example LED and OLED emission curves.
Figure 3:
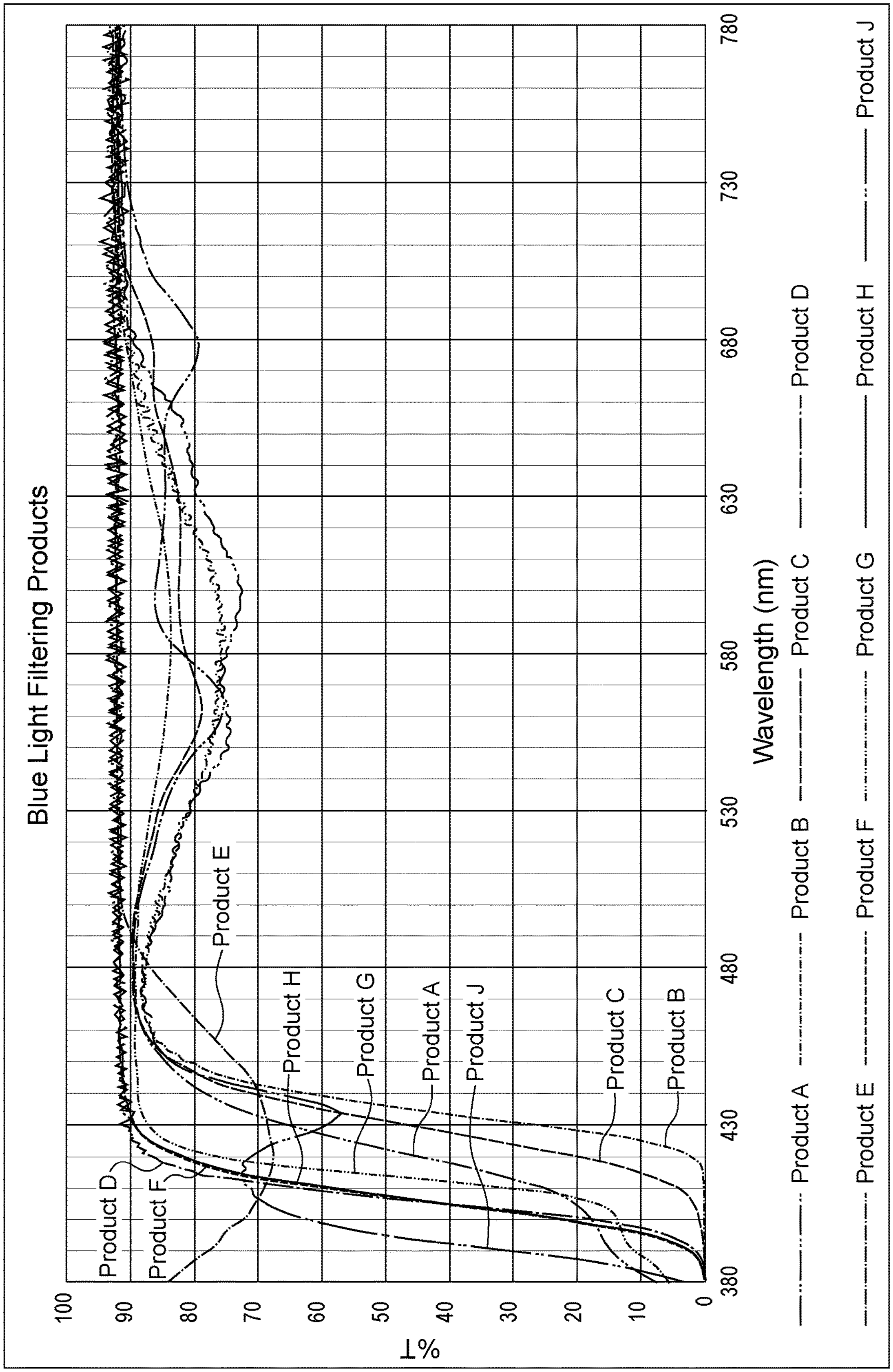
FIG. 3 illustrates transmission curves for prior art blue light filtration products.
Figure 4:
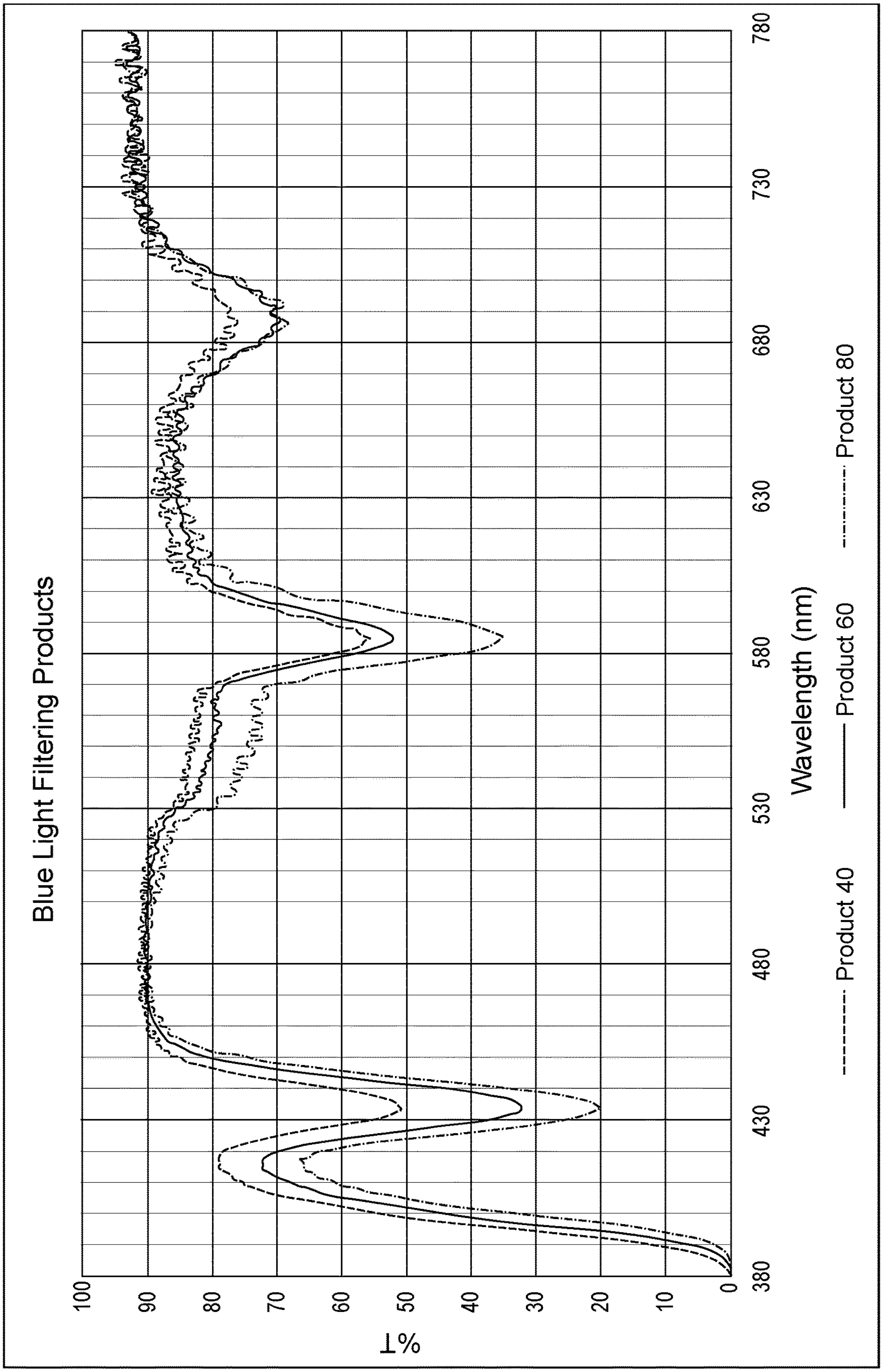
FIG. 4 illustrates transmission curves for prior art blue light filtration products.
Figure 5:
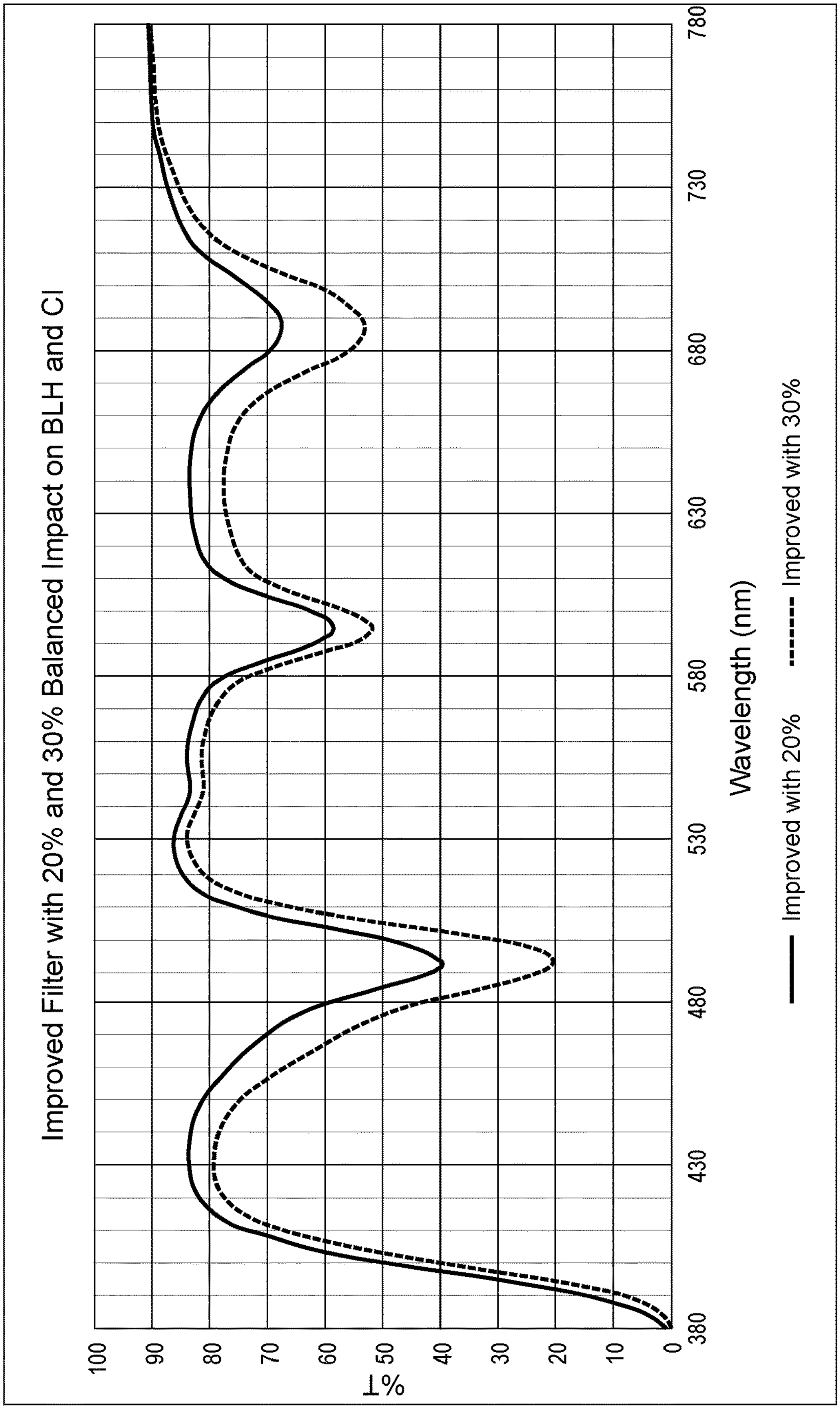
FIG. 5 shows transmission curves illustrating the transmission impact of embodiments of the disclosed blue light filtration product.
Figure 6:
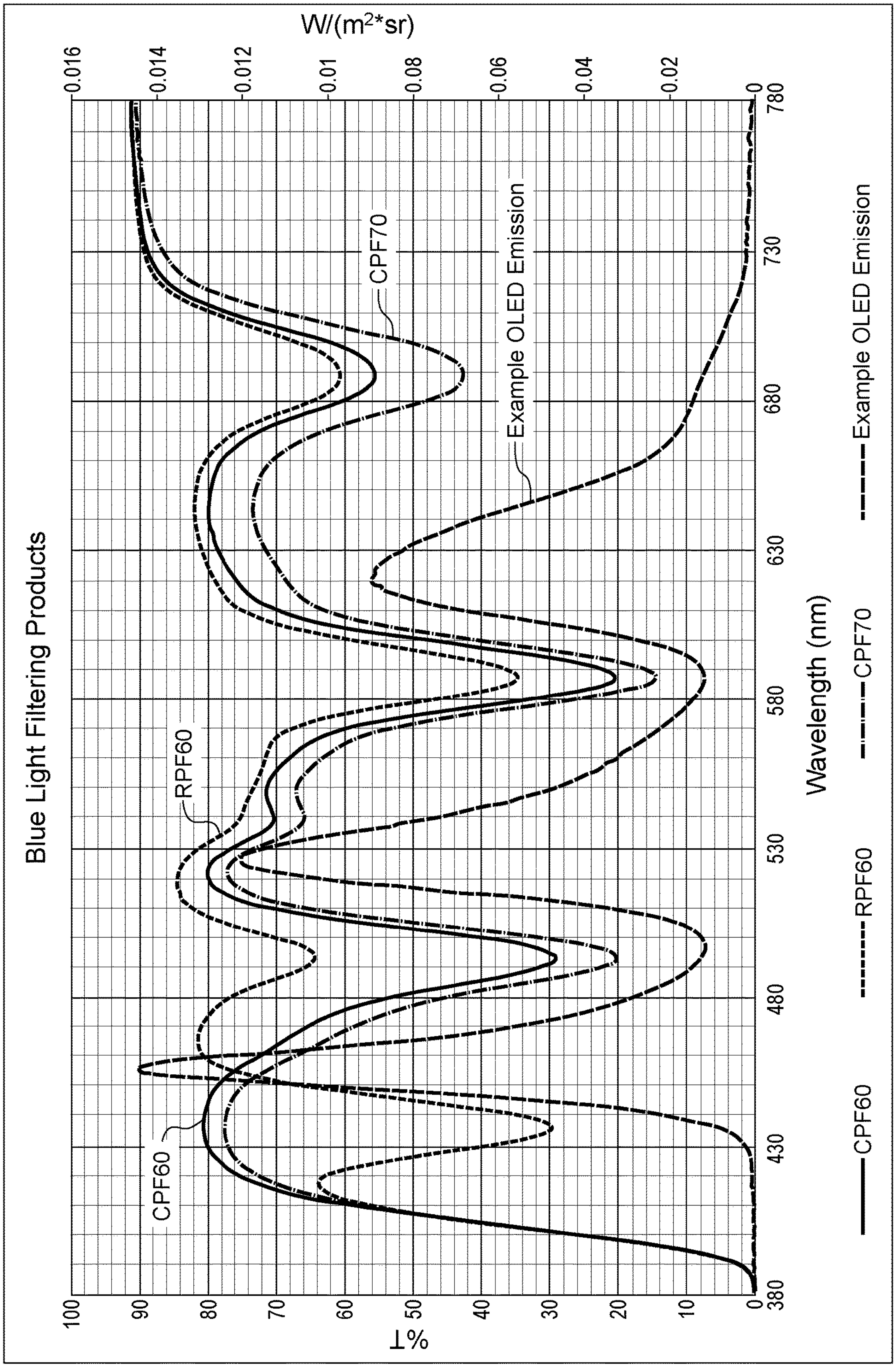
FIG. 6 shows transmission curves illustrating the transmission impact of embodiments of the disclosed blue light filtration product and compares them to an example OLED emission.
Figure 7:
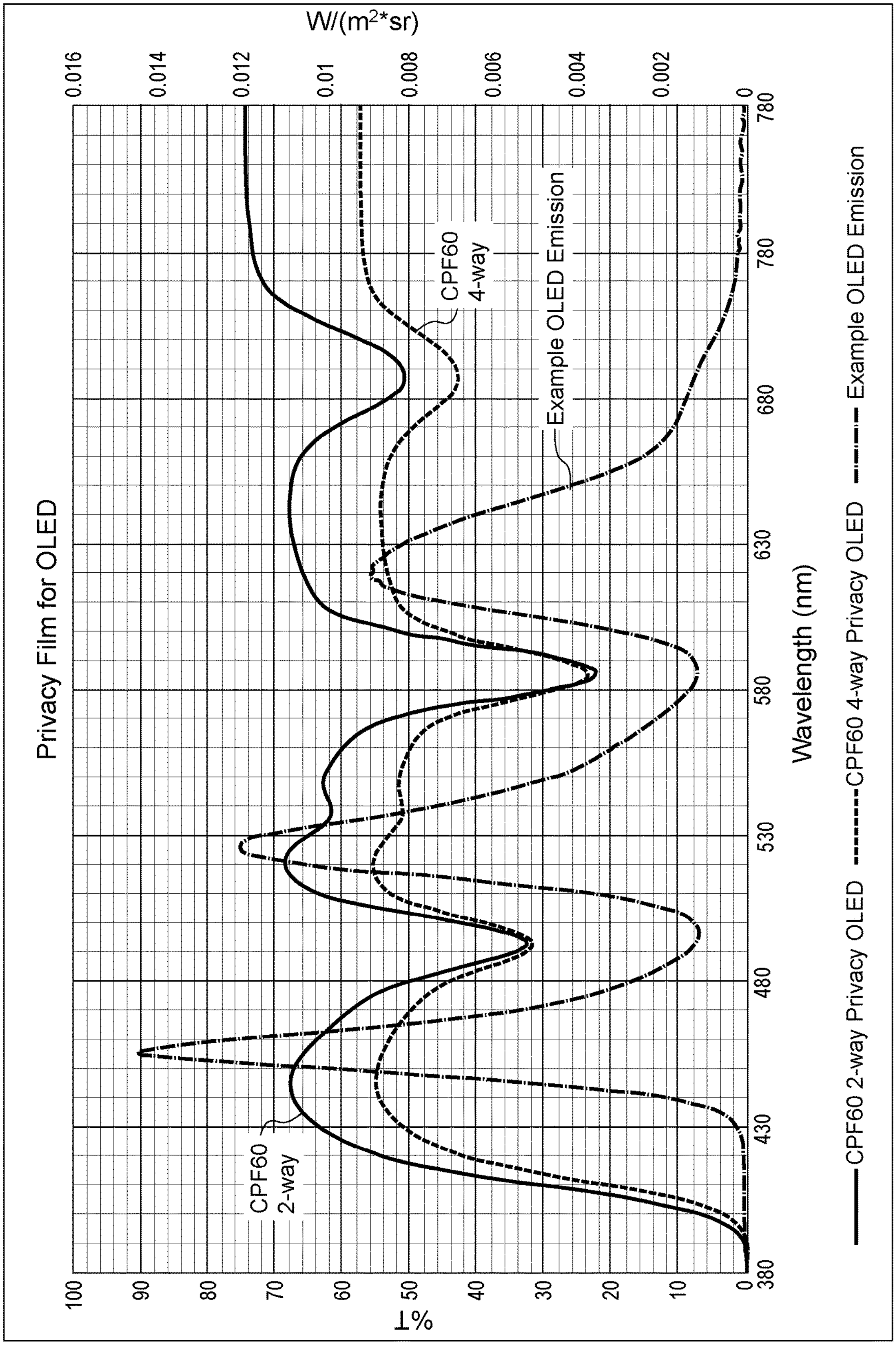
FIG. 7 shows transmission curves illustrating the transmission impact of embodiments of the disclosed blue light filtration product and compares them to an example OLED emission.
Figure 8:
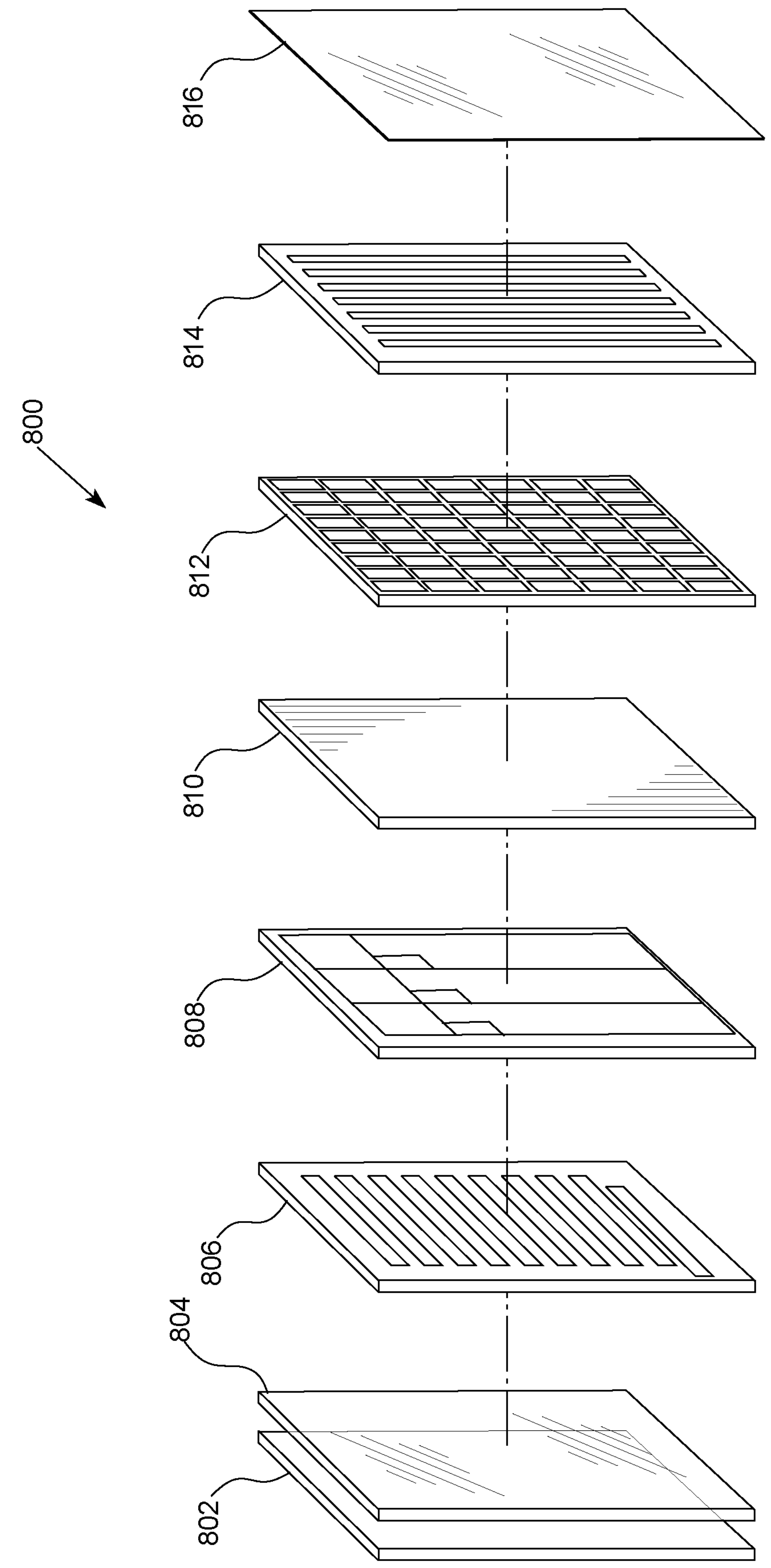
FIG. 8 illustrates an example display for use in combination with the disclosed light filtration product.

This disclosure relates to a light-filtering film or device and eyewear that can be used with electronic display systems, the film/device/eyewear having improved blue light filtration. FIGS. 1-7 illustrate various known emission and transmission curves. FIG. 1 is a graph illustrating Melanopic (circadian rhythm) and BLH (blue light hazard) sensitivity curves. FIG. 2 illustrates example LED and OLED emission curves. FIGS. 3 and 4 illustrate various transmission curves for known blue light filtration products. FIGS. 5-7 illustrate transmission curves for the light-filtering layer embodiments described herein. FIG. 8 illustrates an example display for use in combination with the disclosed blue light filtration product when it is implemented into a display product.

As used herein,

- the term “absorption range” refers to a range of wavelengths that a given absorbing compound (such as a dye) or light-absorption filter can absorb, and the absorption may be partial such that the dye(s) or filter absorbs some, but not all, light within the absorption range;
- the term “absorption peak” refers to the wavelength(s) that a given absorbing compound (such as a dye) or light-absorption filter absorbs more than any other wavelength(s);
- the term “emission” refers to light that is actively being created and emitted from a light source, such as a display screen, a light array within a display screen, or light otherwise produced naturally (for example, by the sun) or manually;
- the term “transmission” or “transmittance” (or variants thereof such as, but not limited to, “transmit” or “transmitted”) refers to light that has passed through a light-absorption filter such as any of the light-absorption filters (film, display, eyewear, etc.) described herein. As such, a decreased in transmission, for example, means the amount of light leaving the light-absorption filter is less than the amount of light that entered the light-absorption filter; and
- the term “transmission value” refers to the percentage of light within a specific wavelength range that is permitted to pass through a filter such as any of the light-absorption filters described herein. As such, transmission value does not refer to the active process of emitting light but instead the ability of a light-absorption filter to absorb light within a specific wavelength range.

FIG. 1 illustrates the two, above-mentioned BLH and Melanopic curves plotting peak sensitivity (y-axis) against wavelength (x-axis). More specifically, the y-axis is scaled to illustrate maximum sensitivity as having a value of 1.00. The first curve is the BLH Sensitivity Curve, which defines, by wavelength, the increasing risk to retina health. As illustrated, peak impact occurs between 435 nm and 440 nm. The second curve is the Melanopic (Circadian Impact) Sensitivity Curve, which defines, by wavelength, the increasing impact on our circadian rhythms. As illustrated, peak impact occurs between 485 nm and 495 nm (for example, 490 nm).

As mentioned above, different display technologies have different emission curves and varying amounts of light being emitted at each wavelength. FIG. 2 is a graph illustrating the LED and OLED emission curves plotting radiance (y-axis) against wavelength (x-axis). The dashed line illustrates atypical LED emission curve, and the solid line illustrates atypical OLED emission curve. In FIG. 2, three peaks in emission can be seen. These peaks correspond to blue (400 nm-500 nm), green (500 nm-600 nm), and red (600 nm-700 nm). The specific shape and location of those peaks can be variable for different displays.

Particularly important with regard to the emission of harmful blue light is the shape and location of the blue emission peaks. As illustrated in FIG. 2, the blue peak for OLED is typically shifted to a longer blue light wavelength, which places the peak to the right (longer wavelength) compared to the BLH peak but much closer to the melanopic wavelength peak. This shift to longer wavelengths (compared to LED displays) is good for reducing the BLH to the retina but is worse for the impact it has on circadian rhythms.

A relative but quantitative impact of displays on the BLH as well as circadian rhythms can be calculated by multiplying the emission curve shown in FIG. 2 by the respective sensitivity curve shown in FIG. 1. The resulting function is then integrated or summed to give a total of emissions that are weighted by the BLH.

There are a number of known products that can be used to filter light from portions of the display spectrum. Unfortunately, these products are less effective in making an impact on OLED displays since the peak blue emissions tend to be at longer blue wavelengths and peak absorptions tend to be at shorter blue wavelengths. These same products, unsurprisingly, also have more difficulty reducing the impact on circadian rhythms. A graph of the transmission spectrum for known products being sold as blue light filters is shown in FIG. 3 where the percent transmission (i.e., transmission value) of light (y-axis) is plotted against wavelengths of light (x-axis). As illustrated, the relatively short blue wavelengths illustrate where transmission drops due to where most of the blue light filtration occurs, which is at or below approximately 450 nm. This is because the filtration (regions of lower transmittance) is focused on shorter wavelengths for these different products. This type of filtration is much less effective in reducing the emission of an OLED display compared to an LED display since, as mentioned above, the blue peak in an OLED display is at longer wavelengths that are closer to 490 nm.

FIG. 4 illustrates additional prior art filters that function well for LED displays, but do not filter adequately for displays with longer wavelength blue transmission (i.e., OLED displays). These filters are also charted on the graph in FIG. 4 by showing percent transmission (i.e., transmission value) of light (y-axis) plotted against wavelengths of light (x-axis). The peak blue filtration of these products is typically around 435 nm to 440 nm. Therefore, these filters also do not minimize the impact of OLED displays on circadian rhythm.

Unlike the above-recited known products, the disclosed filters may have a greater reduction on both the Blue Light Hazard (BLH) and the Circadian Impact (CI) for an OLED display (for example, OLED displays having an emission curve like the example curves illustrated in FIGS. 2 and 6-7). This reduction is calculated as a percentage with the following equations:

% Reduction in blue light toxicity =

$$\left((BLH * OLED \text{ emission})_{w/o\ filter} - (BLH * OLED \text{ emission})_{with\ filter}\right) / (BLH * OLED \text{ emission})_{w/o\ filter}$$

% Reduction in Circadian Impact =

$$\left((CI * OLED \text{ emission})_{w/o\ filter} - (CI * OLED \text{ emission})_{with\ filter}\right) / (CI * OLED \text{ emission})_{w/o\ filter}$$

The products whose transmission curves are illustrated in FIG. 3, are listed below in Tables 1 and 2. Table 1 shows measurements taken of the various products, which incorporate dyes as disclosed further herein, when they are used with an LED display. Table 2 shows measurements taken of the various products when they are used with an OLED display.

TABLE 1

| | | Filter Product | | | | | | | | |
|---|---|---|---|---|---|---|---|---|---|---|
| | | A | B | C | D | E | F | G | H | J |
| w/ LED | ΔCI(%) | 15.8 | 21.5 | 17.3 | 8.2 | 16.9 | 8.1 | 11.9 | 8.4 | 19.8 |
| | ΔToxicity(%) | 19.6 | 31.4 | 25.2 | 8.8 | 26.8 | 8.9 | 11.5 | 9.2 | 24.8 |

TABLE 2

| | | Filter Product | | | | | | | | |
|---|---|---|---|---|---|---|---|---|---|---|
| | | A | B | C | D | E | F | G | H | J |
| w/ OLED | ΔCI(%) | 13.7 | 16.6 | 13.7 | 8.1 | 14.9 | 7.9 | 11.8 | 8.2 | 16.3 |
| | ΔToxicity(%) | 14.0 | 17.6 | 15.4 | 8.5 | 22.6 | 8.3 | 11.0 | 8.6 | 16.0 |

As evidenced by the data in Tables 1 and 2, there is a larger "percent reduction" in both CI and Toxicity when the Filter Products A-J are used to filter light from an LED display compared to light from an OLED display. In other words, while the various filters do reduce BLH and CI from LED and OLED displays, they are more effective on LED displays than they are on OLED displays.

Some embodiments of the disclosure (for example, those illustrated in FIG. 5, showing the percent transmission (i.e., transmission value) of light (y-axis) plotted against wavelengths of light (x-axis)) have an improved design that aims for 20% or 30% transmission reduction from OLED displays while also improving perceived performance of the OLED display. More specifically, the two graphed embodiments aim to reduce transmission across the entire visible spectrum by 20% or 30%, respectively. Table 3 illustrates data for these filters.

TABLE 3

| | | Filter Product | |
|---|---|---|---|
| | | Improved 20% | Improved 30% |
| w/OLED | ΔCI(%) | 22.9 | 30.5 |
| | ΔToxicity(%) | 23.0 | 31.5 |

Therefore, the products disclosed herein function to decrease transmission of at least longer wavelength blue light. FIGS. 5-7 illustrate embodiments of various transmission curves of the disclosed filters, and they illustrate a decrease in blue light transmission at various points along the transmission curve. For example, decreases in transmission are seen at wavelength ranges 460 nm to 520 nm (with peak absorption around 495 nm), 570 nm to 610 nm (with peak absorption around 590 nm), and 660 nm to 725 nm (with peak absorption around 685 nm). While FIG. 5 only shows the percent transmission of light (y-axis) plotted against wavelengths of light (x-axis), FIGS. 6 and 7 both show the percent transmission (i.e., transmission value) of light (left y-axis) as well as radiance (right y-axis) plotted against wavelength (x-axis).

The absorbing compounds referenced herein can be comprised of dyes that are tuned such that they are compatible with each other and the polymer substrate (i.e., the dyes don't interact/react with each other or with the polymer substrate (for example, a resin)) that they are mixed with. At least one absorption dye or other absorption component may be chosen so that the peak absorption for blue is in the short wavelength blue range (for example, between 420 nm and 450 nm) and/or long wavelength blue range (for example, between 460 nm and 520 nm). In some cases, the dye can have a full width half max of less than (or equal to) 50 nm, such as 40 nm, 30 nm, 20 nm, 10 nm, or even 5 nm, to reduce the negative impact to overall light transmission (for example, luminance of the display) when light is absorbed by the absorption dye in the filter. In some embodiments, color correction is added to the filter to ensure that absorption of the various wavelengths does not negatively impact the experience of the user. For example, color correction may be implemented as chosen dyes that have their maximum absorption in the green/yellow (between 570 nm and 610 nm) and/or red (between 660 nm and 725 nm) wavelength regions. These color corrections may enable the light-filtering layer/film/product to minimally impact the original color appearance (for example, the white point of a display). In other words, with the light-filtering layer/film/product added to a display or eyewear, the white point from a light-emitting device may be limited to no more than a predetermined amount of change of the x and y coordinates. For example, the white point for D65 is x=0.313, y=0.329, and the amount of x and y coordinate change from the white point may be no more than x<±0.15, y<±0.15 as measured with CIE 1931 color space. In some embodiments, the ratios of the color correction dyes to the blue light absorbing dyes may be as follows:

TABLE 4

| Ratio | Low | High |
|---|---|---|
| Color correction dye (570 nm to 610 nm) to blue light absorbing dye (460 nm to 520 nm) | 6:5 | 5:2 |
| Color correction dye (660 nm to 725 nm) to blue light absorbing dye (460 nm to 520 nm) | 1:1 | 11:5 |

Various classes of dyes can be used to accomplish the above-listed goals, and example dye classes/chemical structures, as well as dyes within each class, are provided below in Table 5. The below-listed dyes all have narrow absorption peaks (i.e., a full-width half max as described above). However, for short wavelength blue absorbers, the dyes may, alternatively, have a sharp, long-wavelength edge. Additionally, the listed dyes can be stable to UV light and environmental conditions that might cause the dye(s) to degrade. Multiple modifications within each of these classes can adjust the optical and physical properties of these dyes.

TABLE 5

| Absorber Color Range | Classes/Dyes | Preferred Dyes |
|---|---|---|
| Short Wavelength Blue Absorbers | polyene (ex: carotenoids), polyaromatics (ex: perylene), triazine, triazoles, benzophenones, coumarins, styryl dyes, donor-acceptor dyes, cyanines, merocyanines, porphyrins (including metallized and metal-free) | styryl dyes, merocyanines, porphyrins (including metallized and metal-free) |
| Long Wavelength Blue Absorbers | coumarins, styryl dyes, cyanines, merocyanines, donor-acceptor dyes, porphyrins (including metallized and metal-free) | styryl dyes, merocyanines, porphyrins (including metallized and metal-free) |
| Green/Yellow Absorbers | azo, metal azo, diazo, anthraquinone, styryl dyes, cyanines, merocyanines, donor-acceptor dyes, xanthin, quinoline, nitroso, triarylmethane, tetraazoporphyrins (including metallized and metal-free), phthalocyanine (including metallized and metal-free) | metal azo, tetraazoporphyrins (including metallized and metal-free), phthalocyanine (including metallized and metal-free) |
| Red Absorbers | azo, metal azo, diazo, anthraquinone, styryl dyes, cyanines, merocyanines, donor-acceptor dyes, indigoid dyes, squarylium, tetraazoporphyrins (including metallized and metal-free), phthalocyanine (including metallized and metal-free) | squarylium, tetraazoporphyrins (including metallized and metal-free), phthalocyanine (including metallized and metal-free) |

The above-listed dyes are suitable for combining with each other. For example, in one embodiment, a light-filtering film/layer/device may include at least one blue light absorber (short and/or long wavelength), at least one yellow/green light absorber, and at least one red light absorber. In some embodiments, an example combination of dyes may include one porphyrin dye and two phthalocyanine dyes. In another embodiment, an example combination may include one porphyrin dye, one tetraazoporphyrin dye, and one phthalocyanine dye.

In some embodiments, the light-filtering film/layer may be applied to electronic display devices that have software-enabled color correction based on ambient lighting conditions (for example, True Tone technology provided by Apple®). The software-enabled color correction can be enabled or disabled by a viewer, and there are significant color temperature differences between the two settings. The light-filtering film/layer disclosed herein is designed so that, regardless of the software-enabled color correction status (enabled v. disabled), the film/layer accurately reflects the color temperature of light being emitted by the device. In other words, the light-filtering film/layer provides little to no color temperature change and little to no change in the white point (for example, as above where the amount of x and y coordinate change may be no more than x<±0.15, y<±0.15 as measured with CIE 1931 color space) when the software-enabled color correction is enabled and when the software-enabled color correction is disabled.

For example, the film/layer/device disclosed herein can have at least three absorption peaks along the visible light spectrum. The light-filtering device can be comprised of a polymer substrate and at least three absorbing compounds that are combined with the polymer substrate, wherein each absorbing compound can absorb light in a notch band having a full-width half maximum of no more than 40 nm, and the three compounds can be combined so that the correlated color temperature for light produced by a screen transmitted through the light-filtering device is within about 1000 Kelvin of the correlated color temperature for light produced by a screen that is not transmitted through the light-filtering device. The first absorbing compound can have peak absorption between 436 nm and 522 nm, the second absorbing compound can have peak absorption between 548 nm to 616 nm, and the third absorbing compound can have peak absorption between 643 nm to 730 nm. The first absorbing compound may function to decrease the problematic blue light (for example, the wavelength covering the BLH or the Melanopic ranges). The second and third absorbing compounds may function to provide color balance so that images seen by the viewer retain a similar white point and correlated color temperature. Table 6 illustrates data points taken from the embodiments in FIGS. 6-7, and further explanations are detailed below.

TABLE 6

Absorption ranges and peaks and their associated transmission values

| | CPF60 | RPF60 | CPF70 | CPF60 2-way Privacy | CPF60 4-way Privacy |
|---|---|---|---|---|---|
| First Absorbing Compound | | | | | |
| Max Range | 438-521 nm | 465-518 nm | 436-522 nm | 445-520 nm | 447-520 nm |
| Max 1 Transmission | 80.6% | 81.4% | 77.6% | 67.7% | 55.1% |
| Max 2 Transmission | 80.0% | 84.6% | 77.1% | 68.5% | 55.5% |
| Avg. Trans. @ Max Range | 62.5% | 75.9% | 57.2% | 55.4% | 47.1% |
| FWHM Range | 478-504 nm | 483-503 nm | 477-505 nm | 480-504 nm | 480-504 nm |
| Transmission @ FWHM | 40.5% | 68.5% | 33.2% | 40.6% | 37.4% |
| Peak Absorption | 493 nm | 493 nm | 493 nm | 493 nm | 493 nm |
| Transmission @ Peak | 29.1% | 64.4% | 20.3% | 32.9% | 32.0% |
| Second Absorbing Compound | | | | | |
| Max Range | 548-616 nm | 567-615 nm | 548-616 nm | 548-615 nm | 547-614 nm |
| Max 1 Transmission | 71.4% | 69.6% | 67.1% | 62.8% | 51.7% |
| Max 2 Transmission | 74.6% | 77.8% | 67.5% | 65.0% | 52.5% |
| Avg. Trans. @ Max Range | 53.2% | 56.9% | 47.0% | 49.1% | 42.3% |
| FWHM Range | 575-600 nm | 577-599 nm | 574-600 nm | 575-597 nm | 575-597 nm |
| Transmission @ FWHM | 31.9% | 43.4% | 26.0% | 31.0% | 29.8% |
| Peak Absorption | 587 nm | 587 nm | 587 nm | 586 nm | 586 nm |
| Transmission @ Peak | 20.5% | 34.7% | 14.6% | 22.5% | 23.5% |
| Third Absorbing Compound | | | | | |
| Max Range | 643-730 nm | 643-730 nm | 643-730 nm | 642-730 nm | 642-730 nm |
| Max 1 Transmission | 79.9% | 82.0% | 73.3% | 67.9% | 54.3% |
| Max 2 Transmission | 88.9% | 89.5% | 86.8% | 73.3% | 56.9% |
| Avg. Trans. @ Max Range | 72.9% | 75.9% | 64.6% | 62.9% | 50.6% |
| FWHM Range | 673-706 nm | 673-706 nm | 672-707 nm | 672-705 nm | 672-705 nm |
| Transmission @ FWHM | 61.3% | 65.8% | 50.2% | 54.7% | 45.4% |
| Peak Absorption | 688 nm | 688 nm | 688 nm | 688 nm | 687 nm |
| Transmission @ Peak | 55.7% | 60.8% | 42.7% | 50.9% | 42.8% |
| Fourth Absorbing Compound | | | | | |
| Max Range | — | 417-465 nm | — | — | — |
| Max 1 Transmission | — | 63.9% | — | — | — |
| Max 2 Transmission | — | 81.4% | — | — | — |
| Avg. Trans. @ Max Range | — | 56.5% | — | — | — |
| FWHM Range | — | 427-447 nm | — | — | — |
| Transmission @ FWHM | — | 39.1% | — | — | — |
| Peak Absorption | — | 436 nm | — | — | — |
| Transmission @ Peak | — | 29.7% | — | — | — |

First Absorbing Compound

As illustrated in FIGS. 5-7, in some embodiments, the first absorbing compound may have an overall absorption range having a first maximum transmission value at the low end of the range between 433 nm and 453 nm and a second maximum transmission value at the high end of the range between 516 nm and 526 nm. For example, the first absorbing compound can have an overall absorption range between 436 nm+/−3 nm and 522 nm+/−3 nm (for example, between 436 nm and 522 nm or between 438 nm and 521 nm), as illustrated in FIGS. 5-6. In other example, the first absorbing compound can have a narrower overall absorption range such as, but not limited to, between 465 nm+/−3 nm and 518 nm+/−3 nm, as illustrated in FIG. 6. In yet another example, as illustrated in FIG. 7, the first absorbing compound may have an overall absorption range between 446 nm+/−3 nm and 520 nm+/−3 nm (for example, between 445 nm and 520 nm or between 447 nm and 520 nm).

In some embodiments, the first absorbing compound can have a full width half max (FWHM) range that is narrower than the overall absorption range. For example, the FWHM, which can include the peak absorption, for the first absorbing compound can be between 477 nm+/−3 nm and 505 nm+/−3 nm (i.e., 28 nm+/−6 nm) or between 483 nm+/−3 nm and 503 nm+/−3 nm (i.e., 20 nm+/−6 nm). As illustrated in FIGS. 5-7, the actual absorption peak for the first absorbing compound may be more precisely between 488 nm and 498 nm (for example, 493 nm+/−3 nm) or between 488 nm and 510 nm (for example, 499+/−3 nm).

The various embodiments of the first absorbing compound, while having similar absorption peaks, may have varying transmission values at their peaks. For example, a first embodiment, illustrated in FIG. 5, can have a transmission value of no more than about 40%+/−3% at the absorption peak, and a second embodiment, also illustrated in FIG. 5, can have a transmission value of no more than about 20%+/−3% at the absorption peak. As illustrated in FIG. 6, while one embodiment, RPF60, can have a transmission value of no more than about 68%+/−3% at the absorption peak (for example, 64.4%), other embodiments can have a transmission value of no more than 35%. For example, as illustrated in FIGS. 6 and 7, the CPF60 embodiment illustrates a transmission value of 29%+/−3% at the absorption peak (for example, 29.1%), the CPF70 embodiment illustrates a transmission value of 20%+/−3% at the absorption peak (for example, 20.3%), the CPF60 2-way privacy embodiment illustrates a transmission value of 33%+/−3% (for example, 32.9%), and the CPF60 4-way privacy embodiment illustrates a transmission value of 32%+/−3% (for example, 32.0%).

In embodiments where the peak absorption is between 436 nm+/−3 nm and 522 nm+/−3 nm for the first absorbing compound, the light-filtering device may have an average transmission, between 436 nm+/−3 nm and 522 nm+/−3 nm, of no more than 65% (for example, between 55% and 65%), as illustrated by the CPF60, RPF60, and CPF70 curves in FIG. 6 and the CPF60 2-way privacy and CPF60 4-way privacy curves in FIG. 7. For example, as illustrated in FIG. 6, the average transmission between 436 nm and 522 nm for the first absorbing compound of the CPF60 embodiment can be around 63.1%, the average transmission between 438 nm and 521 nm for the first absorbing compound of the CPF60 embodiment can be around 62.5%, and the average transmission between 436 nm and 522 nm for the first absorbing compound of the CPF70 embodiment can be around 57.2%. As illustrated in FIG. 6, in embodiments where the peak absorption is between 465 nm+/−3 nm and 518 nm+/−3 nm for the first absorbing compound, the light-filtering device may have an average transmission, between 465 nm+/−3 nm and 518 nm+/−3 nm, of between 70% and 80% (for example, 75.9%), as illustrated by the RPF60 curve. As illustrated in FIG. 7, in embodiments where the peak absorption is between 445 nm+/−3 nm and 520 nm+/−3 nm for the first absorbing compound, the light-filtering device may have an average transmission, between 445 nm+/−3 nm and 520 nm+/−3 nm, of between 50% and 60% (for example, 55.4% or 47.1%), as illustrated by the CPF60 2-way privacy curve and the CPF60 4-way privacy curve.

To obtain these average transmission values, the various embodiments may have limits at their first and second maximum transmission values. For example, the first absorbing compound may have a first maximum transmission value within a first wavelength range of 433 nm to 453 nm (for example, a value of 436 nm, 438 nm, 445 nm, or 447 nm) wherein the first maximum transmission value is at least 55% (for example, between 75% and 85% or between 55% and 70%). Additionally, the first absorbing compound may have a second maximum transmission value within a second wavelength range of 516 nm to 526 nm (for example, a value of 520 nm, 521 nm, or 522 nm) wherein the second maximum transmission value is at least 55% (for example, between 75% and 85% or between 55% and 70%). More specifically, the CPF60 curve in FIG. 6 illustrates a first maximum transmission value of 80.6% (at 438 nm) and a second maximum transmission value of 80.0% (at 521 nm), and the CPF70 curve in FIG. 6 illustrates a first maximum transmission value of 77.6% (at 436 nm) and a second maximum transmission value of 77.1% (at 522 nm). The CPF60 2-way privacy curve in FIG. 7 illustrates a first maximum transmission value of 67.7% (at 445 nm) and a second maximum transmission value of 68.5% (at 520 nm), and the CPF60 4-way privacy curve in FIG. 7 illustrates a first maximum transmission value of 55.1% (at 447 nm) and a second maximum transmission value of 55.5% (at 520 nm).

In another example, the first absorbing compound may have a first maximum transmission value within a first wavelength range of 460 nm to 470 nm (for example, a value of 465 nm) wherein the first maximum transmission value is at least 70% (for example, between 75% and 85%). Additionally, the first absorbing compound may have a second maximum transmission value within a second wavelength range of 514 nm to 522 nm (for example, a value of 518 nm) wherein the second maximum transmission value is at least 70% (for example, between 80% and 90%). More specifically, the RPF60 curve in FIG. 6 illustrates a first maximum transmission value of 81.4% (at 465 nm) and a second maximum transmission value at 84.6% (at 518 nm).

In embodiments where the FWHM and the peak absorption are between 477 nm+/−3 nm and 505 nm+/−3 nm for the first absorbing compound, the light-filtering device may have a lower average transmission (i.e., stronger absorption compared to the average transmission for the full wavelength range of, for example, 436 nm to 522 nm), between 477 nm+/−3 nm and 505 nm+/−3 nm, of between 30% and 44%, as illustrated by the CPF60 and CPF70 curves in FIG. 6 and the CPF60 2-way and CPF60 4-way privacy curves in FIG. 7. For example, as illustrated in FIG. 6, the average transmission between 477 nm and 505 nm for the first absorbing compound of the CPF60 embodiment is around 41.7%, and the average transmission between 477 nm and 505 nm for the first absorbing compound of the CPF70 embodiment is around 33.2%. In embodiments where the FWHM and the peak absorption are between 478 nm and 504 nm, as illustrated by the CPF60 embodiment in FIG. 6, the average transmission between 478 nm and 504 nm for the first absorbing compound is around 40.5%. As illustrated in FIG. 7, the average transmission between 480 nm and 504 nm for the first absorbing compound of the 2-way embodiment is around 40.6%, and the average transmission between 480 nm and 504 nm for the first absorbing compound of the 4-way embodiment is around 37.4%. In embodiments where the FWHM and/or the peak absorption are between 483 nm+/−3 nm and 503 nm+/−3 nm for the first absorbing compound, the light-filtering device may have an average transmission, between 483 nm+/−3 nm and 503 nm+/−3 nm, of between 65% and 72% (for example, 68.5%), as illustrated by the RPF60 curve in FIG. 6.

Second Absorbing Compound

As illustrated in FIGS. 5-7, in some embodiments, the second absorbing compound may have an overall absorption range having a first maximum transmission value at the low end of the range between 543 nm and 570 nm and a second maximum transmission value at the high end of the range between 610 nm and 620 nm. For example, the second absorbing compound can have an overall absorption range between 548 nm+/−3 nm and 616 nm+/−3 nm (for example, between 548 nm and 616 nm, between 548 nm and 615 nm, or between 547 nm and 614 nm), as illustrated in FIGS. 5-7. In other example, the second absorbing compound can have a narrower overall absorption range such as, but not limited to, between 567 nm+/−3 nm and 615 nm+/−3 nm, as illustrated in FIG. 6.

In some embodiments, the second absorbing compound can have a full width half max (FWHM) range that is narrower than the overall absorption range. For example, the FWHM, which can include the peak absorption, for the second absorbing compound can be between 575 nm+/−3 nm and 600 nm+/−3 nm (i.e., 25 nm+/−6 nm). As illustrated in FIGS. 5-7, the actual absorption peak for the second absorbing compound may be more precisely between 582 nm and 592 nm (for example, 587 nm or 586+/−3 nm).

The various embodiments of the second absorbing compound, while having similar absorption peaks, may have varying transmission values at their peaks. For example, a first embodiment, illustrated in FIG. 5, can have a transmission value of no more than about 57%+/−3% at the absorption peak, and a second embodiment, also illustrated in FIG. 5, can have a transmission value of no more than about 52%+/−3% at the absorption peak. As illustrated in FIG. 6, while one embodiment, RPF60, can have a transmission value of no more than about 40%+/−3% at the absorption peak (for example, 34.7%), other embodiments can have a transmission value of no more than 25%. For example, as illustrated in FIGS. 6 and 7, the CPF60 embodiment illustrates a transmission value of 20%+/−3% at the absorption peak (for example, 20.5%), the CPF70 embodiment illustrates a transmission value of 15%+/−3% at the absorption peak (for example, 14.6%), the CPF60 2-way privacy embodiment illustrates a transmission value of 22%+/−3% (for example, 22.5%), and the CPF60 4-way privacy embodiment illustrates a transmission value of 24%+/−3% (for example, 23.5%).

In embodiments where the peak absorption is between 548 nm+/−3 nm and 616 nm+/−3 nm for the second absorbing compound, the light-filtering device may have an average transmission, between 548 nm+/−3 nm and 616 nm+/−3 nm, of no more than 60% (for example, between 42% and 57% or between 58% and 65%), as illustrated by the CPF60, RPF60, and CPF70 curves in FIG. 6 and the CPF60 2-way privacy and CPF60 4-way privacy curves in FIG. 7. For example, as illustrated in FIG. 6, the average transmission between 548 nm and 616 nm for the second absorbing compound of the CPF60 embodiment can be around 53.2%, the average transmission between 548 nm and 616 nm for the second absorbing compound of the RPF60 embodiment can be around 61.1%, the average transmission between 548 nm and 616 nm for the second absorbing compound of the CPF70 embodiment can be around 47.0%, the average transmission between 548 nm and 616 nm for the second absorbing compound of the CPF60 2-way privacy embodiment can be around 49.4%, and the average transmission between 548 nm and 616 nm for the second absorbing compound of the CPF60 4-way privacy embodiment can be around 42.4%. As illustrated in FIG. 6, in embodiments where the peak absorption is between 567 nm+/−3 nm and 615 nm+/−3 nm for the second absorbing compound, the light-filtering device may have an average transmission, between 567 nm+/−3 nm and 615 nm+/−3 nm, of between 55% and 60% (for example, 56.9%), as illustrated by the RPF60 curve. As illustrated in FIG. 7, in embodiments where the peak absorption is between 547 nm+/−3 nm and 615 nm+/−3 nm for the second absorbing compound, the light-filtering device may have an average transmission, between 547 nm+/−3 nm and 615 nm+/−3 nm, of between 40% and 50% (for example, 49.1% or 42.3%), as illustrated by the CPF60 2-way privacy curve and the CPF60 4-way privacy curve.

To obtain these average transmission values, the various embodiments may have limits at their first and second maximum transmission values. For example, the second absorbing compound may have a first maximum transmission value within a first wavelength range of 543 nm to 570 nm (for example, a value of 547 nm, 548 nm, or 567 nm) wherein the first maximum transmission value is at least 50% (for example, between 65% and 75% or between 50% and 65%). Additionally, the second absorbing compound may have a second maximum transmission value within a second wavelength range of 610 nm to 620 nm (for example, a value of 614 nm, 615 nm, or 616 nm) wherein the second maximum transmission value is at least 50% (for example, between 65% and 75% or between 50% and 65%). More specifically, the CPF60 curve in FIG. 6 illustrates a first maximum transmission value of 71.4% (at 548 nm) and a second maximum transmission value of 74.6% (at 616 nm), and the CPF70 curve in FIG. 6 illustrates a first maximum transmission value of 67.1% (at 548 nm) and a second maximum transmission value of 67.5% (at 616 nm). The CPF60 2-way privacy curve in FIG. 7 illustrates a first maximum transmission value of 62.8% (at 548 nm) and a second maximum transmission value of 65.0% (at 615 nm), and the CPF60 4-way privacy curve in FIG. 7 illustrates a first maximum transmission value of 51.7% (at 547 nm) and a second maximum transmission value of 52.5% (at 614 nm).

In another example, the second absorbing compound may have a first maximum transmission value within a first wavelength range of 560 nm to 580 nm (for example, a value of 567 nm) wherein the first maximum transmission value is at least 65% (for example, between 65% and 75%). Additionally, the second absorbing compound may have a second maximum transmission value within a second wavelength range of 610 nm to 620 nm (for example, a value of 615 nm) wherein the second maximum transmission value is at least 70% (for example, between 65% and 75%). More specifically, the RPF60 curve in FIG. 6 illustrates a first maximum transmission value of 69.6% (at 567 nm) and a second maximum transmission value at 77.8% (at 615 nm).

In embodiments where the FWHM and the peak absorption are between 575 nm+/−3 nm and 600 nm+/−3 nm for the second absorbing compound, the light-filtering device may have a lower average transmission (i.e., stronger absorption compared to the average transmission for the full wavelength range of, for example, 548 nm to 616 nm), between 575 nm+/−3 nm and 600 nm+/−3 nm, of between 22% and 35%, as illustrated by the CPF60 and CPF70 curves in FIG. 6 and the CPF60 2-way and CPF60 4-way privacy curves in FIG. 7, or between 42% and 49%, as illustrated by the RPF60 curve in FIG. 6. For example, as illustrated in FIG. 6, the average transmission between 575 nm and 600 nm for the second absorbing compound of the CPF60 embodiment is around 31.9%, the average transmission between 575 nm and 600 nm for the second absorbing compound of the RPF60 embodiment is around 45.6%, and the average transmission between 575 nm and 600 nm for the second absorbing compound of the CPF70 embodiment is around 25.3%. In embodiments where the FWHM and the peak absorption are between 574 nm and 600 nm, as illustrated by the CPF70 embodiment in FIG. 6, the average transmission between 574 nm and 600 nm for the second absorbing compound is around 26.0%. As illustrated in FIG. 7, the average transmission between 575 nm and 600 nm for the second absorbing compound of the 2-way embodiment is around 33.1%, and the average transmission between 575 nm and 600 nm for the second absorbing compound of the 4-way embodiment is around 31.3%. In embodiments where the FWHM and/or the peak absorption are between 577 nm+/−3 nm and 599 nm+/−3 nm for the second absorbing compound, the light-filtering device may have an average transmission, between 577 nm+/−3 nm and 599 nm+/−3 nm, of between 40% and 47% (for example, 43.4%), as illustrated by the RPF60 curve in FIG. 6. In embodiments where the FWHM and/or the peak absorption are between 575 nm+/−3 nm and 597 nm+/−3 nm for the second absorbing compound, the light-filtering device may have an average transmission, between 575 nm+/−3 nm and 597 nm+/−3 nm, of between 25% and 35% (for example, 31.0% or 29.8%), as illustrated by the CPF60 2-way and CPF60 4-way privacy curves in FIG. 7.

Third Absorbing Compound

As illustrated in FIGS. 5-7, in some embodiments, the third absorbing compound may have an overall absorption range having a first maximum transmission value at the low end of the range between 640 nm and 655 nm and a second maximum transmission value at the high end of the range between 725 nm and 735 nm. For example, the third absorbing compound can have an overall absorption range between 643 nm+/−3 nm and 730 nm+/−3 nm (for example, between 642 nm and 730 nm or between 643 nm and 730 nm), as illustrated in FIGS. 5-7.

In some embodiments, the third absorbing compound can have a full width half max (FWHM) range that is narrower than the overall absorption range. For example, the FWHM, which can include the peak absorption, for the third absorbing compound can be between 672 nm+/−3 nm and 707 nm+/−3 nm (i.e., 35 nm+/−6 nm). As illustrated in FIGS. 5-7, the actual absorption peak for the third absorbing compound may be more precisely between 684 nm and 692 nm (for example, 688 nm or 687 nm+/−3 nm).

The various embodiments of the third absorbing compound, while having similar absorption peaks, may have varying transmission values at their peaks. For example, a first embodiment, illustrated in FIG. 5, can have a transmission value of no more than about 77%+/−3% at the absorption peak, and a second embodiment, also illustrated in FIG. 5, can have a transmission value of no more than about 54%+/−3% at the absorption peak. As illustrated in FIG. 6, while some embodiments can have a transmission value of no more than about 65%+/−3% at the absorption peak (for example, 42.7%, 42.8%, 50.9%, 55.7%, or 60.8%), other embodiments can have a transmission value of no more than 53% (for example, 42.7%, 42.8%, or 50.9%). For example, as illustrated in FIGS. 6 and 7, the CPF60 embodiment illustrates a transmission value of 55%+/−3% at the absorption peak (for example, 55.7%), the RPF60 embodiment illustrates a transmission value of 60%+/−3% at the absorption peak (for example, 60.8%), the CPF70 embodiment illustrates a transmission value of 43%+/−3% at the absorption peak (for example, 42.7%), the CPF60 2-way privacy embodiment illustrates a transmission value of 51%+/−3% (for example, 50.9%), and the CPF60 4-way privacy embodiment illustrates a transmission value of 43%+/−3% (for example, 42.8%).

In embodiments where the peak absorption is between 643 nm+/−3 nm and 730 nm+/−3 nm for the third absorbing compound, the light-filtering device may have an average transmission, between 643 nm+/−3 nm and 730 nm+/−3 nm, of no more than 80% (for example, between 70% and 79% or between 50% and 65%), as illustrated by the CPF60, RPF60, and CPF70 curves in FIG. 6 and the CPF60 2-way privacy and CPF60 4-way privacy curves in FIG. 7. For example, as illustrated in FIG. 6, the average transmission between 643 nm and 730 nm for the third absorbing compound of the CPF60 embodiment can be around 72.9%, the average transmission between 643 nm and 730 nm for the third absorbing compound of the RPF60 embodiment can be around 75.9%, the average transmission between 643 nm and 730 nm for the third absorbing compound of the CPF70 embodiment can be around 64.6%, the average transmission between 643 nm and 730 nm for the third absorbing compound of the CPF60 2-way privacy embodiment can be around 62.7%, and the average transmission between 643 nm and 730 nm for the third absorbing compound of the CPF60 4-way privacy embodiment can be around 50.6%. As illustrated in FIG. 7, in embodiments where the peak absorption is between 642 nm+/−3 nm and 730 nm+/−3 nm for the third absorbing compound, the light-filtering device may have an average transmission, between 642 nm+/−3 nm and 730 nm+/−3 nm, of between 50% and 65% (for example, 62.9% or 50.6%), as illustrated by the CPF60 2-way privacy curve and the CPF60 4-way privacy curve.

To obtain these average transmission values, the various embodiments may have limits at their first and second maximum transmission values. For example, the third absorbing compound may have a first maximum transmission value within a first wavelength range of 640 nm to 655 nm (for example, a value of 642 nm or 643 nm) wherein the first maximum transmission value is at least 53% (for example, between 53% and 60%, between 60% and 70%) or at least 70% (for example, between 70% and 85%). Additionally, the third absorbing compound may have a second maximum transmission value within a second wavelength range of 725 nm to 735 nm (for example, a value of 730 nm) wherein the second maximum transmission value is at least 55% (for example, between 50% and 60% or between 68% and 78%) or at least 80% (for example, between 80% and 90% or between 85% and 95%).

More specifically, the CPF60 curve in FIG. 6 illustrates a first maximum transmission value of 79.9% (at 643 nm) and a second maximum transmission value of 88.9% (at 730 nm), the RPF60 curve in FIG. 6 illustrates a first maximum transmission value of 82.0% (at 643 nm) and a second maximum transmission value of 89.5% (at 730 nm), and the CPF70 curve in FIG. 6 illustrates a first maximum transmission value of 73.3% (at 643 nm) and a second maximum transmission value of 86.8% (at 730 nm). The CPF60 2-way privacy curve in FIG. 7 illustrates a first maximum transmission value of 67.9% (at 642 nm) and a second maximum transmission value of 73.3% (at 730 nm), and the CPF60 4-way privacy curve in FIG. 7 illustrates a first maximum transmission value of 54.3% (at 642 nm) and a second maximum transmission value of 56.9% (at 730 nm).

In embodiments where the FWHM and the peak absorption are between 672 nm+/−3 nm and 707 nm+/−3 nm for the third absorbing compound, the light-filtering device may have a lower average transmission (i.e., stronger absorption compared to the average transmission for the full wavelength range of, for example, 643 nm to 730 nm), between 672 nm+/−3 nm and 707 nm+/−3 nm, of between 58% and 70%, as illustrated by the CPF60 and RPF60 curves in FIG. 6, or between 45% and 55%, as illustrated by the CPF70 curve in FIG. 6 and the CPF60 2-way and CPF60 4-way privacy curves in FIG. 7. For example, as illustrated in FIG. 6, the average transmission between 672 nm and 707 nm for the third absorbing compound of the CPF60 embodiment is around 61.9%, the average transmission between 672 nm and 707 nm for the third absorbing compound of the RPF60 embodiment is around 66.3%, and the average transmission between 672 nm and 707 nm for the third absorbing compound of the CPF70 embodiment is around 50.2%. As illustrated in FIG. 7, the average transmission between 672 nm and 707 nm for the third absorbing compound of the CPF60 2-way privacy embodiment is around 55.2%, and the average transmission between 672 nm and 707 nm for the third absorbing compound of the CPF60 4-way privacy embodiment is around 45.7%. In embodiments where the FWHM and the peak absorption are between 673 nm and 706 nm, as illustrated by the CPF60 and RPF60 embodiments in FIG. 6, the average transmission between 673 nm and 706 nm for the third absorbing compound can be between 60% and 70% (for example, 61.3% or 65.8%, respectively). As illustrated in FIG. 7, the average transmission between 672 nm and 705 nm for the third absorbing compound of the 2-way embodiment is around 54.7%, and the average transmission between 672 nm and 705 nm for the third absorbing compound of the 4-way embodiment is around 45.4%.

Fourth Absorbing Compound

In some embodiments of the disclosed device, the light-filtering device may be further comprised of a fourth absorbing compound combined with the polymer substrate. The fourth absorbing compound can absorb light in a notch band having a full-width half maximum of no more than 40 nm and can be provided in combination with the first, the second, and the third absorbing compounds so that, for light produced by a screen transmitted through the light-filtering device, correlated color temperature may be within about 1000 Kelvin of the correlated color temperature for light produced by the screen that is not transmitted through the light-filtering device. The fourth absorbing compound can have peak absorption between 417 nm and 465 nm and can function to decrease the problematic blue light in wavelengths covering the BLH range. Table 6 illustrates data points taken from the embodiment in FIG. 6, and further explanations are detailed below.

As illustrated in FIG. 6, in some embodiments, the fourth absorbing compound may have an overall absorption range having a first maximum transmission value at the low end of the range between 410 nm and 420 nm and a second maximum transmission value at the high end of the range between 460 nm and 470 nm. For example, the fourth absorbing compound can have an overall absorption range between 417 nm+/−3 nm and 465 nm+/−3 nm, as illustrated in FIG. 6.

In some embodiments, the fourth absorbing compound can have a full width half max (FWHM) range that is narrower than the overall absorption range. For example, the FWHM, which can include the peak absorption, for the fourth absorbing compound can be between 427 nm+/−3 nm and 447 nm+/−3 nm (i.e., 20 nm+/−6 nm). As illustrated in FIG. 6, the actual absorption peak for the fourth absorbing compound may be more precisely between 430 nm and 440 nm (for example, 436 nm+/−3 nm).

The transmission value for the absorption peak of the fourth absorbing compound may be comparable to the transmission values for embodiments of the first absorbing compound. For example, one embodiment, illustrated in FIG. 6, can have a transmission value of no more than about 40%+/−3% at the absorption peak. For example, the RPF60 embodiment in FIG. 6 illustrates a transmission value of 30%+/−3% at the absorption peak (for example, 29.7%).

In embodiments where the peak absorption is between 417 nm+/−3 nm and 465 nm+/−3 nm for the fourth absorbing compound, the light-filtering device may have an average transmission, between 417 nm+/−3 nm and 465 nm+/−3 nm, of no more than 60% (for example, between 50% and 60%), as illustrated by the RPF60 curve in FIG. 6. For example, as illustrated in FIG. 6, the average transmission between 417 nm and 465 nm for the fourth absorbing compound of the RPF60 embodiment can be around 56.5%.

To obtain these average transmission values, the embodiments may have limits at their first and second maximum transmission values. For example, the fourth absorbing compound may have a first maximum transmission value within a first wavelength range of 410 nm to 420 nm (for example, a value of 417 nm) wherein the first maximum transmission value is at least 60% (for example, between 60% and 70%). Additionally, the fourth absorbing compound may have a second maximum transmission value within a second wavelength range of 460 nm to 470 nm (for example, a value of 465 nm) wherein the second maximum transmission value is at least 75% (for example, between 75% and 85%). More specifically, the RPF60 curve in FIG. 6 illustrates a first maximum transmission value of 63.9% (at 417 nm) and a second maximum transmission value of 81.4% (at 465 nm).

In embodiments where the FWHM and the peak absorption are between 427 nm+/−3 nm and 447 nm+/−3 nm for the fourth absorbing compound, the light-filtering device may have a lower average transmission (i.e., stronger absorption compared to the average transmission for the full wavelength range of, for example, 417 nm to 465 nm), between 427 nm+/−3 nm and 447 nm+/−3 nm, of between 35% and 43%, as illustrated by the RPF60 curve in FIG. 6. For example, as illustrated in FIG. 6, the average transmission between 427 nm and 447 nm for the fourth absorbing compound of the RPF60 embodiment is around 39.1%.

Generally, for embodiments of the light-filtering device that have a fourth absorbing compound with peak absorption between 417 nm and 465 nm and a first absorbing compound with peak absorption between 465 nm and 518 nm, the first absorbing compound can have lower levels of absorption compared to embodiments with a first absorbing compound and no fourth absorbing compound. This is due to the presence of a second "blue" absorber that functions to absorb wavelengths in the BLH range.

Applications

Figure 11:
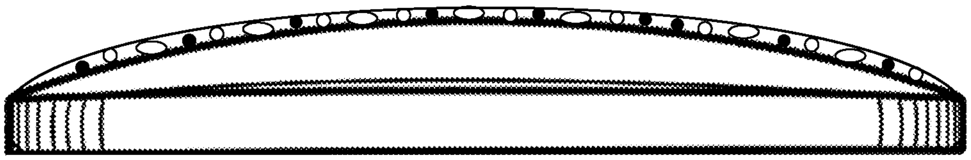
FIG. 11 illustrates an example lens with the improved light filtration product added to a final lens product as a coating.
Figure 10:
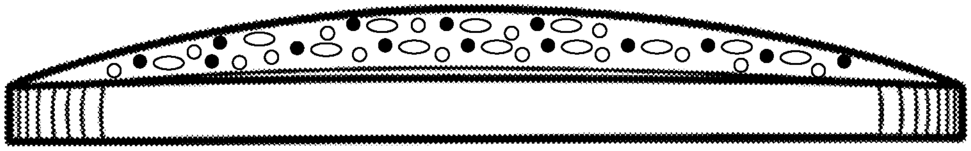
FIG. 10 illustrates an example lens with the improved light filtration product added to a final lens product using methods such as tinting or imbibing.
Figure 9:
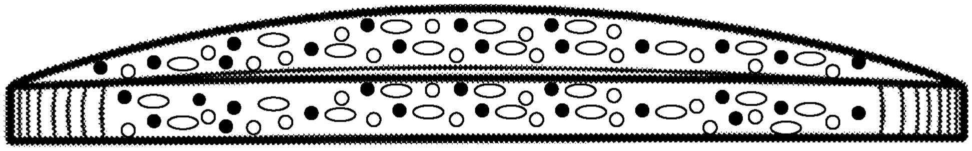
FIG. 9 illustrates an example lens with the improved light filtration product incorporated throughout the lens material.

The above-described absorbing compounds can be incorporated into films, electronic devices or, in some cases, into ophthalmic applications (i.e., eyewear) such as, but not limited to, eyeglasses, goggles, augmented reality devices, virtual reality devices, extended reality devices, and/or mixed reality devices. The light-filtering dyes may be added to the lens material before or after the lenses are made. FIGS. 9-11 illustrate various embodiments of the light-absorbing compounds, such as dyes, being added to a lens. Therefore, the light-filtering dyes may be layered on to a finished product (i.e., a finished lens), as illustrated in FIGS. 10-11, or may be incorporated into the lens material prior to lens formation so that the light-absorbing compounds are distributed throughout the lens, as illustrated in FIG. 9. For example, the light-filtering dyes may be added as a film laminated on the lens (FIG. 11), may be a layer coated on a lens (FIG. 11), may be imbibed into (i.e., mixed into the material of) the lens (FIG. 10). Alternatively, the light-filtering dyes may be incorporated into the lens material prior to lens formation using in-mass lens technologies (for example, but not limited to, injection molding, casting, or compression molding) (FIG. 9).

In embodiments involving a film, the film may be laminated onto the front or the back of the lens during production or after the eyewear have been manufactured (i.e., an after-market application). The film may include an adhesive on one side to aide it in adhering to the eyewear. In some cases, the film may be comprised of one absorbing layer and one adhesive layer, such that all absorbing compounds and polymers are mixed together in the absorbing layer, as illustrated in FIG. 11, before the adhesive layer is added. In other cases, the absorbing layer may be several, separate layers provided in combination such that, if there are three absorbing compounds, each compound has its own layer.

Alternatively, two of the three may be combined and the third may be provided in its own layer. In embodiments having four compounds, they each may have their own layer or any combination of compounds may be made such that there are fewer than four absorbing layers.

In embodiments where a coating is placed on the lens, the coating may be applied using a vacuum deposition process where the lens is heated, and a thin layer of coating material is applied. The coating application may occur by vaporizing the coating material in the vacuum chamber and then allowing it to condense on the surface of the lens. Application of the coating material may be on the back and/or front of the lens. In some cases, one layer may be applied, and, in some cases, multiple layers may be applied. As described above with the film, the layers may each include their own absorbing compound, or the layers(s) may be a combination of one or more of the absorbing compounds, as illustrated in FIG. 11. In some cases, the coating is applied using a trans-bonding process.

In embodiments where a coating is placed on the lens, the coating may be applied as a liquid coating where the absorbing compounds have been mixed within the coating solution. the coating solution would then have components such as polymer binders, monomers, thermal or UV curing agents, adhesion promotors, etc. These components can provide a more permanent layer on the lens where the dye is suspended. In application, the liquid coating can be applied by various methods known in the industry such as, but not limited to, dip coating, spin coating, flow coating, curtain coatings, etc. The coating can be allowed to solidify and become more permanent through means of drying, thermal curing, and/or UV/visible radiation curing. In some embodiments, application of the coating material may be on the back and/or the front of the lens. Additionally, one or more layers may be applied. As described above with the film, the layers may each include their own absorbing compound, or the layer(s) may be a combination of one or more of the absorbing compounds, as illustrated in FIG. 11.

In embodiments where the light-filtering layer is imbibed into the lens, the absorbing compounds may be applied to the surface of the lens and the lens may then be treated or processed to enable the absorbing compounds to penetrate the lens material, as illustrated in FIG. 10. In some embodiments, the treatment process involves heat. The application of absorbing compounds may occur in sequence (i.e., one absorbing compound is applied at a time) or one or more of the absorbing compounds may be mixed together prior to being imbibed into the lens.

In embodiments where the absorbing compounds are incorporated into electronic devices, such as display screens 800, they may be incorporated as a film on top of the cover glass 816 or into, or onto, any of the layers of the display screen such as, but not limited to, the diffuser layer, within the LCD module, or behind the cover glass. More specifically, the light-filtering layer can be incorporated into any of the various display layers illustrated in FIG. 8, such as a backlight unit (BLU) 802, a BLU component 804 such as a light-guide plate, reflector, diffuser, or brightness enhancement film, a polarizer filter layer 806, a TFT (thin film transistor) array layer 808, a liquid crystal panel 810, a color filter 812, or a second polarizer layer 814. Photolithography is one application process for incorporation of the light-filtering layer onto a layer of a display panel, but any other screen-printing methods may be used to apply the light-filtering layer. Further, methods such as film application/lamination, coating, or incorporation into a physical layer during production can be used to incorporate the light-filtering layer.

In embodiments using in-mass technologies, the absorption dyes can be mixed directly into the lens material during production. This ensures even distribution throughout the lens, as illustrated in FIG. 9 wherein various dyes are distributed throughout the entirety of the lens. Various examples of in-mass lens technologies include, as listed above, injection molding, casting, or compression molding.

In embodiments using injection molding, a thermoplastic polymer can be injected into a mold and allowed to cool in the mold to form the lens. Examples of lens materials used can include polycarbonate (PC), acrylic (PMMA), cyclin olefin polymer/copolymer (COP/CPC), or polystyrene (PS). Additionally, the material can be provided in pellet form ranging in size from approximately 2-5 mm in diameter.

More specifically, in embodiments using PC, pellets of lens material can be combined with dye material, melted together into a molten combination, and extruded into a lens mold where the molten combination is allowed to cool before being removed. The specific steps involve mixing and/or blending the liquid or solid dye materials with the raw lens material (ex., the PC pellets). This mixed/blended material is then fed into the hopper of an injection molding press, which directs the PC pellets and dye into a long, high-pressure cylinder that has a rotating screw along a central axis. Through a combination of temperature and friction (from the rotating screw), the polycarbonate pellets and any solid dye components are melted and blended further together. Once the materials reach a designated temperature and/or viscosity, there can be a very uniform consistency throughout the combined materials, and the screw can push the combined material forward into the mold, which has a front and back component that are clamped together under high pressure. The front and back components of the mold determine the lens shape. Therefore, the injection molding process can be used with a wide range of molds that have variability in their shape, which affects the curvature and thickness of the lens or lens blank. Once the materials are cooled, they have formed a lens and can be ejected from the molding press.

To achieve beneficial light-filtering, the amount of dye can be determined by its relative absorption and the thickness of the lens. More specifically, it would roughly follow the Beer-Lambert law:

$$A=\varepsilon cl$$

where ε is the molar absorption coefficient, c is the molar concentration, and l is the path length (or thickness of the lens). In embodiments using dyes in films or coatings, this same calculation can be completed to determine the grams of dye to use per the area of the film or coating.

As mentioned above, another production option for in-mass lens technology is casting lenses. Using this production method, the dye(s) can be incorporated into lenses that are made with thermoset polymers in a casting process. More specifically, liquid monomer can be mixed with dye(s) as well as initiator/cross-linking agent(s). The dispersion of the dye(s) can achieve uniformity relatively easily through the mixing process. The liquid mixture can then be fed into an assembly holding two molds (for example, a front and back or a top and bottom) that are spaced a desired distance to form a lens with a desired thickness. The mixture in the mold is then cured through heat, UV radiation, or a combination of the two until it reaches the desired polymerization level; usually governed by time in an oven or overall dosage of UV radiation. Similar to injection molding, the amount/concentration of the dye(s) is governed by the Beer-Lambert law.

While injection molding, casting, and compression molding are all efficient production methods for incorporating dye(s) into the lens material, they do have disadvantages when used for lenses that have a high plus or minus prescription (ex: thicker in center than on edges or thicker at edges than in center) as the relative absorption will change throughout the area of the lens depending on where there is more material deposited. Therefore, determining which of the above-listed production methods to use can be based on the type of lens. For example, a standard lens with the above-described novel light filtering features has a uniform amount of lens material distributed throughout the lens and may be produced using an in-mass lens technology, which evenly distributes dye material throughout the lens material, as illustrated in FIG. 9. Whereas a near-sighted or far-sighted lens, which may incorporate a much denser amount of lens material in limited areas of the lens, may use a post-lens production method so that the dyes remain evenly distributed across the lens, such as a film (illustrated in FIG. 11), coating (illustrated in FIG. 11), tinting (illustrated in FIG. 10), or imbibing (illustrated in FIG. 10) method. In this manner, the lens is produced first, and the dye absorption material can then be evenly layered on or incorporated into the lens afterwards.

Persons of ordinary skill in arts relevant to this disclosure and subject matter hereof will recognize that embodiments may comprise fewer features than illustrated in any individual embodiment described by example or otherwise contemplated herein. Embodiments described herein are not meant to be an exhaustive presentation of ways in which various features may be combined and/or arranged. Accordingly, the embodiments are not mutually exclusive combinations of features; rather, embodiments can comprise a combination of different individual features selected from different individual embodiments, as understood by persons of ordinary skill in the relevant arts. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

The invention claimed is:

1. Light-filtering eyewear, the light-filtering eyewear comprising:
- a polymer substrate;
- a first absorbing compound combined with the polymer substrate, the first absorbing compound absorbing light in a notch band having a full-width half maximum of no more than 50 nm;
- a second absorbing compound combined with the polymer substrate, the second absorbing compound absorbing light in a notch band having a full-width half maximum of no more than 50 nm;
- a third absorbing compound combined with the polymer substrate, the third absorbing compound absorbing light in a notch band having a full-width half maximum of no more than 50 nm; and
- a lens material having the polymer substrate, the first absorbing compound, the second absorbing compound, and the third absorbing compound added to the lens material,
- wherein
  - the first absorbing compound has peak absorption between 436 nm and 522 nm,
  - the second absorbing compound has peak absorption between 548 nm to 616 nm,
  - the third absorbing compound has peak absorption between 643 nm to 730 nm, and
  - the light-filter eyewear provides
    - a first minimum transmission value for the first absorbing compound at a first wavelength within a first wavelength range of 483 nm to 510 nm,
    - a first maximum transmission value for the first absorbing compound at a second wavelength within a second wavelength range of 433 nm to 453 nm, and
    - a second maximum transmission value for the first absorbing compound at a third wavelength within a third wavelength range of 516 nm to 526 nm.

2. The light-filtering eyewear of claim 1, wherein, between 436 nm and 522 nm, the light-filtering eyewear provides an average transmission value of between 55% and 65%.

3. The light-filtering eyewear of claim 1, wherein
- the first absorbing compound has peak absorption between 477 nm and 505 nm, and
- between 477 nm and 505 nm, the light-filtering eyewear provides an average transmission value of between 30% and 44%.

4. The light-filtering eyewear of claim 1, wherein
- the light-filtering eyewear provides an average transmission value between the first maximum absorption value and the second maximum absorption value of no more than 65%,
- the first minimum transmission value is no more than 35%,
- the first maximum transmission value is at least 55%, and
- the second maximum transmission value is at least 55%.

5. The light-filtering eyewear of claim 1, wherein, between 483 nm and 503 nm, the light-filtering eyewear provides an average transmission value of between 65% and 72%.

6. The light-filtering eyewear of claim 1, wherein, between 548 nm and 616 nm, the light-filtering eyewear provides an average transmission value of between 42% and 57%.

7. The light-filtering eyewear of claim 1, wherein
- the second absorbing compound has peak absorption between 575 nm and 600 nm, and between 575 nm and 600 nm, the light-filtering eyewear provides an average transmission value of between 22% and 35%.

8. The light-filtering eyewear of claim 1, wherein the light-filtering eyewear provides a first minimum transmission value for the second absorbing compound at a first wavelength within a first wavelength range of 582 nm to 592 nm, the first minimum transmission value is no more than 25%, a first maximum transmission value for the second absorbing compound at a second wavelength within a second wavelength range of 543 nm to 570 nm, the first maximum transmission value is at least 50%, a second maximum transmission value for the second absorbing compound at a third wavelength within a third wavelength range of 610 nm to 620 nm, the second maximum transmission value is at least 50%, and an average transmission value between the first maximum absorption value and the second maximum absorption value of no more than 60%.

9. The light-filtering eyewear of claim 1, wherein, between 643 nm and 730 nm, the light-filtering eyewear provides an average transmission value of between 70% and 79%.

10. The light-filtering eyewear of claim 1, wherein, between 643 nm and 730 nm, the light-filtering eyewear provides an average transmission value of between 50% and 75%.

11. The light-filtering eyewear of claim 1, wherein the third absorbing compound has peak absorption between 672 nm and 707 nm, and between 672 nm and 707 nm, the light-filtering eyewear provides an average transmission value of between 45% and 65%.

12. The light-filtering eyewear of claim 1, wherein the light-filtering eyewear provides a first minimum transmission value for the third absorbing compound at a first wavelength within a first wavelength range of 684 nm to 692 nm, the first minimum transmission value is no more than 65%, a first maximum transmission value for the third absorbing compound at a second wavelength within a second wavelength range of 640 nm to 655 nm, the first maximum transmission value is at least 70%, a second maximum transmission value for the third absorbing compound at a third wavelength within a third wavelength range of 725 nm to 735 nm, the second maximum transmission value is at least 80%, and an average transmission value between the first maximum absorption value and the second maximum absorption value of no more than 80%.

13. The light-filtering eyewear of claim 1, wherein the light-filtering eyewear provides a first minimum transmission value for the third absorbing compound at a first wavelength within a first wavelength range of 684 nm to 692 nm, the first minimum transmission value is no more than 53%, a first maximum transmission value for the third absorbing compound at a second wavelength within a second wavelength range of 640 nm to 655 nm, the first maximum transmission value is at least 53%, a second maximum transmission value for the third absorbing compound at a third wavelength within a third wavelength range of 725 nm to 735 nm, the second maximum transmission value is at least 55%, and an average transmission value between the first maximum absorption value and the second maximum absorption value of no more than 80%.

14. Light-filtering eyewear, the light-filtering eyewear comprising:

a polymer substrate;

a first absorbing compound combined with the polymer substrate, the first absorbing compound absorbing light in a notch band having a full-width half maximum of no more than 50 nm;

a second absorbing compound combined with the polymer substrate, the second absorbing compound absorbing light in a notch band having a full-width half maximum of no more than 50 nm;

a third absorbing compound combined with the polymer substrate, the third absorbing compound absorbing light in a notch band having a full-width half maximum of no more than 50 nm; and a lens material having the polymer substrate, the first absorbing compound, the second absorbing compound, and the third absorbing compound added to the lens material, wherein the first absorbing compound has peak absorption between 436 nm and 522 nm, the second absorbing compound has peak absorption between 548 nm to 616 nm, the third absorbing compound has peak absorption between 643 nm to 730 nm, and the light-filtering eyewear provides a first minimum transmission value for the first absorbing compound at a first wavelength within a first wavelength range of 488 nm to 510 nm, a first maximum transmission value for the first absorbing compound at a second wavelength within a second wavelength range of 460 nm to 470 nm, and a second maximum transmission value for the first absorbing compound at a third wavelength within a third wavelength range of 514 nm to 522 nm.

15. The light-filtering eyewear of claim 14, wherein the light-filtering eyewear provides an average transmission value between the first maximum absorption value and the second maximum absorption value of no more than 80%, the first minimum transmission value is no more than 68%, the first maximum transmission value is at least 70%, and the second maximum transmission value is at least 70%.

16. The light-filtering eyewear of claim 14, wherein, between 548 nm and 616 nm, the light-filtering eyewear provides an average transmission value of between 58% and 65%.

17. The light-filtering eyewear of claim 14, wherein the second absorbing compound has peak absorption between 575 nm and 600 nm, and between 575 nm and 600 nm, the light-filtering eyewear provides an average transmission value of between 42% and 49%.

18. The light-filtering eyewear of claim 14, wherein the third absorbing compound has peak absorption between 672 nm and 707 nm, and between 672 nm and 707 nm, the light-filtering eyewear provides an average transmission value of between 58% and 70%.

19. Light-filtering eyewear, the light-filtering eyewear comprising:

a polymer substrate;

a first absorbing compound combined with the polymer substrate, the first absorbing compound absorbing light in a notch band having a full-width half maximum of no more than 50 nm;

a second absorbing compound combined with the polymer substrate, the second absorbing compound absorbing light in a notch band having a full-width half maximum of no more than 50 nm;

a third absorbing compound combined with the polymer substrate, the third absorbing compound absorbing light in a notch band having a full-width half maximum of no more than 50 nm;

a fourth absorbing compound combined with the polymer substrate, the fourth absorbing compound absorbing light in a notch band having a full-width half maximum of no more than 50 nm; and a lens material having the polymer substrate, the first absorbing compound, the second absorbing compound, the third absorbing compound, and the fourth absorbing compound added to the lens material, wherein the first absorbing compound has peak absorption between 436 nm and 522 nm, the second absorbing compound has peak absorption between 548 nm to 616 nm, the third absorbing compound has peak absorption between 643 nm to 730 nm, and the fourth absorbing compound has peak absorption between 417 nm and 465 nm.

20. The light-filtering eyewear of claim 19, wherein, between 417 nm and 465 nm, the light-filtering eyewear provides an average transmission value of between 50% and 60%.

21. The light-filtering eyewear of claim 19, wherein the fourth absorbing compound has peak absorption between 427 nm and 447 nm, and between 427 nm and 447 nm, the light-filtering eyewear provides an average transmission value of between 35% and 43%.

22. The light-filtering eyewear of claim 19, wherein the light-filtering eyewear provides a first minimum transmission value for the fourth absorbing compound at a first wavelength within a first wavelength range of 430 nm to 440 nm, the first minimum transmission value is no more than 40%, a first maximum transmission value for the fourth absorbing compound at a second wavelength within a second wavelength range of 410 nm to 420 nm, the first maximum transmission value is at least 60%, a second maximum transmission value for the fourth absorbing compound at a third wavelength within a third wavelength range of 460 nm to 470 nm, the second maximum transmission value is at least 75%, and the light-filtering eyewear provides an average transmission value between the first maximum absorption value and the second maximum absorption value of no more than 60%.

* * * * *